(12) United States Patent
Na et al.

(10) Patent No.: US 11,239,754 B2
(45) Date of Patent: Feb. 1, 2022

(54) BIDIRECTIONAL POWER CONVERTER, ELECTRIC VEHICLE, AND CONTROL METHOD FOR BIDIRECTIONAL POWER CONVERTER

(71) Applicant: TOYOTA JIDOSHA KABUSHIKI KAISHA, Toyota (JP)

(72) Inventors: Hyoungjun Na, Nagoya (JP); Ken Toshiyuki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/669,758

(22) Filed: Oct. 31, 2019

(65) Prior Publication Data
US 2020/0153335 A1 May 14, 2020

(30) Foreign Application Priority Data
Nov. 13, 2018 (JP) .............................. JP2018-213091

(51) Int. Cl.
*H02M 3/158* (2006.01)
*H02P 27/08* (2006.01)
(Continued)

(52) U.S. Cl.
CPC ............. *H02M 3/158* (2013.01); *B60L 50/60* (2019.02); *H02M 1/00* (2013.01); *H02P 27/08* (2013.01);
(Continued)

(58) Field of Classification Search
USPC ........................................................ 318/139
See application file for complete search history.

(56) References Cited

U.S. PATENT DOCUMENTS 8,884,564 B2   11/2014  Itoh et al.
2008/0297126 A1*  12/2008  Nagano ............... H02M 3/1584
                                                                  323/271
(Continued)

FOREIGN PATENT DOCUMENTS

CN   206962714 U         2/2018
EP      1659678 A2 *    5/2006   .......... H02M 3/1588
(Continued)

OTHER PUBLICATIONS

Mikko Purhonen et al.; "Wireless Circulating Current Control for Parallel Connected Photovoltaic Inverters;" AFRICON; Sep. 1, 2013; pp. 1-4.
(Continued)

*Primary Examiner* — Jorge L Carrasquillo
(74) *Attorney, Agent, or Firm* — Oliff PLC

(57) ABSTRACT

A bidirectional power converter includes a first terminal, a second terminal, a main reactor, a plurality of sub-circuits and a controller. The sub-circuits each include an upper switching element, a lower switching element, two diodes, and a sub-reactor. The controller sequentially controls the sub-circuits such that: the lower switching element is turned on and turned off and then the upper switching element is turned on and turned off in each of the sub-circuits, while a current is flowing from the first terminal toward the second terminal; and the upper switching element is turned on and turned off and then, the lower switching element is turned on and turned off in each of the sub-circuits, while the current is flowing from the second terminal toward the first terminal.

4 Claims, 13 Drawing Sheets

(51) Int. Cl.
  *B60L 50/60* (2019.01)
  *H02M 1/00* (2006.01)
  *B60K 6/22* (2007.10)

(52) U.S. Cl.
  CPC ............ *B60K 6/22* (2013.01); *B60L 2210/10* (2013.01); *B60Y 2200/91* (2013.01); *B60Y 2200/92* (2013.01); *B60Y 2400/61* (2013.01); *H02M 1/0051* (2021.05)

(56) References Cited

U.S. PATENT DOCUMENTS

| | | | |
|---|---|---|---|
| 2013/0156116 A1* | 6/2013 | Sim .................... | H04B 3/56 375/257 |
| 2015/0222046 A1 | 8/2015 | Akiguchi et al. | |
| 2019/0089238 A1* | 3/2019 | Toshiyuki ............ | H02M 3/158 |
| 2019/0089239 A1* | 3/2019 | Toshiyuki ......... | H02M 7/53871 |
| 2019/0089253 A1* | 3/2019 | Toshiyuki ............ | H02M 1/088 |
| 2020/0304052 A1 | 9/2020 | Na et al. | |

FOREIGN PATENT DOCUMENTS

| | | |
|---|---|---|
| EP | 1659678 A2 | 5/2006 |
| JP | 2001-186768 A | 7/2001 |
| JP | 2009-247092 A | 10/2009 |
| JP | 2011-114931 A | 6/2011 |
| JP | 2015-146289 A | 8/2015 |
| JP | 2018-082506 A | 5/2018 |
| JP | 2019-057993 A | 4/2019 |

OTHER PUBLICATIONS

U.S. Appl. No. 16/775,397, filed Jan. 29, 2020.
Apr. 21, 2021 Notice of Allowance issued in U.S. Appl. No. 16/775,397.
Aug. 5, 2021 Notice of Allowance issued in U.S. Appl. No. 16/775,397.

* cited by examiner

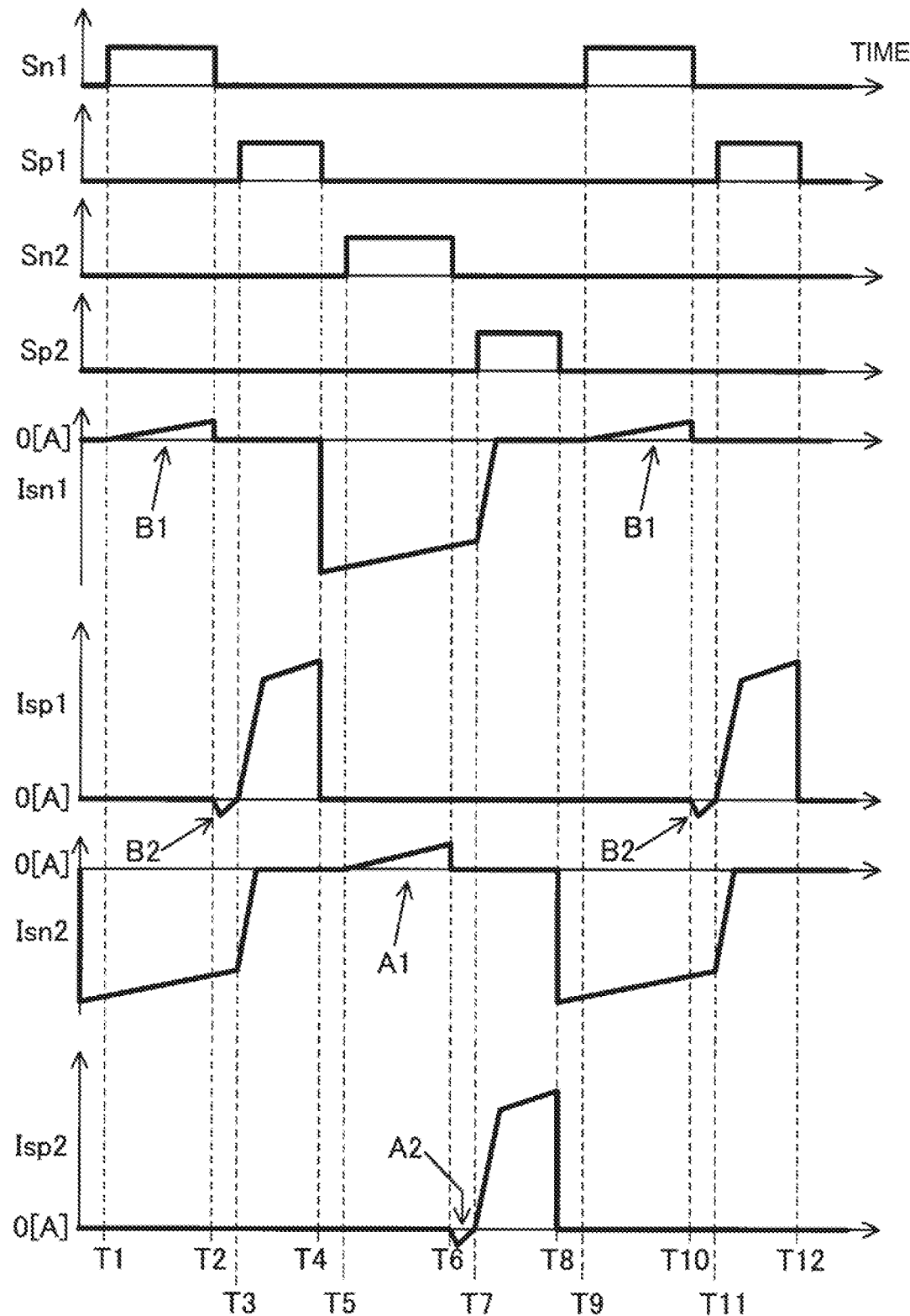

COMPARATIVE EXAMPLE

COMPARATIVE EXAMPLE

COMPARATIVE EXAMPLE

COMPARATIVE EXAMPLE

COMPARATIVE EXAMPLE

BIDIRECTIONAL POWER CONVERTER, ELECTRIC VEHICLE, AND CONTROL METHOD FOR BIDIRECTIONAL POWER CONVERTER

INCORPORATION BY REFERENCE

The disclosure of Japanese Patent Application No. 2018-213091 filed on Nov. 13, 2018 including the specification, drawings and abstract is incorporated herein by reference in its entirety.

BACKGROUND

1. Technical Field

A technique disclosed in the present specification relates to a bidirectional power converter that converts electric power between a first device and a second device that allow input and output of power, an electric vehicle including the bidirectional power converter, and a control method for a bidirectional power converter.

2. Description of Related Art

Power converters include switching elements as main elements that convert electric power. There is a known power converter, in which a plurality of sub-circuits including switching elements are connected in parallel in order to reduce a load applied to the switching elements. For example, such a power converter is disclosed in Japanese Unexamined Patent Application Publication No. 2001-186768 (JP 2001-186768 A). The power converter of JP 2001-186768 A includes a rectifier that rectifies an alternating current output from an alternating current power source to a direct current and a boost converter that boosts a voltage of the rectified current. In the power converter, the boost converter includes two sub-circuits. Each of the sub-circuits is composed of a diode, a switching element, and a sub-reactor. The diode and the switching element are connected in series. The sub-reactor is connected between a main reactor of a voltage converter and a midpoint of a series connection between the diode and the switching element. In the power converter, the switching elements of the two sub-circuits are turned on and turned off alternately. The sub-reactors reduce loss caused by reverse recovery current of the diodes.

SUMMARY

The following issues were found when the plurality of sub-circuits including the switching elements, the diodes, and sub-reactors are adopted in the bidirectional power converter. The sub-circuits adopted in the bidirectional power converter each include a series connection of two switching elements and diodes each in antiparallel connection with corresponding one of the switching elements. One end of each sub-reactor is connected to a midpoint of the series connection of the two switching elements. When the switching elements are turned on and off sequentially always in the same order, a current flows in only one sub-circuit while the current flows in one direction, and a return current is generated between the sub-circuits when the current flows in the reverse direction. The return current flowing between the sub-circuits may cause a loss. The present specification discloses a technique for restricting a return current flowing between sub-circuits in a bidirectional power converter in which the sub circuits are connected in parallel.

The bidirectional power converter disclosed in the present specification enables bidirectional power conversion between a first device and a second device that allow input and output of electric power. The bidirectional power converter is typically applied to electric vehicles. In electric vehicles, electric power is supplied from a battery to a traveling motor when an accelerator pedal is depressed. When a brake pedal is depressed, the traveling motor generates electric power and the electric power is supplied from the traveling motor to the battery. The power converter connected between the battery and the driving motor is the bidirectional power converter.

A first aspect of the disclosure relates to a bidirectional power converter. The bidirectional power converter includes a first terminal, a second terminal, a negative terminal, a main reactor, a plurality of sub-circuits, and a controller. The first terminal is connected to an input and output end of a first device that allows input and output of electric power, and the second terminal is connected to an input and output end of a second device that allows input and output of electric power. The negative terminal is connected to a negative electrode of the second device. A first end of the main reactor is connected to the first terminal. The sub-circuits are connected in parallel between a second end of the main reactor and the second terminal.

Each of the sub-circuits includes an upper switching element, a lower switching element, an upper diode, a lower diode, and a sub-reactor. The upper switching element is connected to the second terminal. The lower switching element is connected between the upper switching element and a negative terminal. In other words, the upper switching element and the lower switching element are connected in series between the second terminal and the negative terminal. The upper switching element is disposed closer to the second terminal, and the lower switching element is disposed closer to the negative terminal. The upper diode is in antiparallel connection with the upper switching element, and the lower diode is in antiparallel connection with the lower switching element. For convenience of description, the series connection between the upper switching element and the lower switching element is referred to as a "switching series connection". One end of the sub-reactor is connected to the second end of the main reactor, and another end of the sub-reactor is connected to a midpoint of the switching series connection.

The controller sequentially controls the sub-circuits. The controller is configured to: turn on and turn off the lower switching element, and then turn on and turn off the upper switching element in each of the sub-circuits, while a current is flowing from the first terminal to the second terminal; and turn on and turn off the upper switching element and then turn on and turn off the lower switching element in each of the sub-circuits, while the current is flowing from the second terminal to the first terminal. That is, in accordance with the direction in which the current flows, the controller selects the switching element to first turn on and turn off, out of the upper switching element and the lower switching element included in the each of the sub-circuits. Thus, it is possible to restrain a return current from flowing between the sub-circuits regardless of the direction in which the current flows. The mechanism will be described in the embodiments.

In the above aspect, the sub-reactor may include a conductor, a first magnetic ring core, and a second magnetic ring core. The conductor may connect the midpoint of the switching series connection and the main reactor. The first magnetic ring core and the second magnetic ring core may surround the conductor. A second magnetic saturation current value at which the second magnetic ring core reaches a magnetic saturation may be smaller than a first magnetic saturation current value at which the first magnetic ring core reaches a magnetic saturation.

With the two magnetic ring cores with different magnetic saturation current values, an inductance when a large current is flowing through the conductor can be made smaller, compared to the case of a reactor having uniform cores. On the other hand, the inductance when a reverse recovery current of the diode flows can be made larger, compared to the case of the reactor having uniform cores. That is, a sub-reactor having two cores with different magnetic saturation current values has a relatively small inductance when the main current of power conversion flows and has a relatively large inductance when a small current (reverse recovery current of the diode and return current discussed above) flows. Such a sub-reactor can restrict the reverse recovery current of the diode and the return current between the sub-circuits, without significantly affecting the power conversion.

A second aspect of the disclosure relates to an electric vehicle. The electric vehicle includes: the bidirectional power converter according to the first aspect; a battery serving as the first device; and an inverter serving as the second device. The inverter has an alternating-current end connected to a traveling motor. The first terminal is connected to a positive terminal of the battery, the second terminal is connected to a direct-current positive terminal of the inverter, and the negative terminal is connected to a negative terminal of the battery and a direct-current negative terminal of the inverter.

A third aspect of the disclosure relates to an electric vehicle. The electric vehicle includes: an inverter having the bidirectional power converter according to the first aspect; a battery serving as the second device; and a traveling motor serving as the first device. The traveling motor includes a coil. The second terminal is connected to a positive terminal of the battery, and the negative terminal is connected to a negative terminal of the battery. The coil also functions as the main reactor. The upper switching element of the sub-circuit serves as an upper arm switching element of the inverter and is connected to the second terminal, and the lower switching element of the sub-circuit serves as a lower arm switching element of the inverter and is connected between the second terminal and the negative terminal. The sub-reactor is connected between the midpoint of the series connection between the upper switching element and the lower switching element and the coil.

A fourth aspect of the disclosure relates to a method for controlling a bidirectional power converter. The bidirectional power converter includes: a first terminal connected to an input and output end of a first device that allows input and output of electric power; a second terminal connected to an input and output end of a second device that allows input and output of electric power; a negative terminal connected to a negative electrode of the second device; a main reactor having a first end connected to the first terminal; and a plurality of sub-circuits connected in parallel between a second end of the main reactor and the second terminal. Each of the sub-circuits includes: an upper switching element connected to the second terminal; a lower switching element connected between the upper switching element and the negative terminal; an upper diode in antiparallel connection with the upper switching element; a lower diode in antiparallel connection with the lower switching element; and a sub-reactor having one end connected to the second end of the main reactor and another end connected to a midpoint of a series connection between the upper switching element and the lower switching element. The control method includes: sequentially controlling, by the controller, the sub-circuits such that the lower switching element is turned on and turned off and then the upper switching element is turned on and turned off in each of the sub-circuits, while a current is flowing from the first terminal toward the second terminal; and sequentially controlling, by the controller, the upper switching element is turned on and turned off and then the lower switching element is turned on and turned off in each of the sub-circuits, while the current is flowing from the second terminal toward the first terminal.

As described above, bidirectional power converters are typically used in electric vehicles. The directional power converter disclosed in the present specification may be applied to a bidirectional voltage converter that converts a voltage between a battery and an inverter. Alternatively, the bidirectional power converter disclosed in the present specification may be applied to an inverter connected between a battery and a traveling motor. An example of application to a bidirectional voltage converter and an example of application to an inverter will be described as the embodiments.

Details and further improvements of the technique disclosed in the present specification will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a timing chart for a regeneration mode (comparative example);

DETAILED DESCRIPTION OF EMBODIMENTS

First Embodiment

Figure 1:
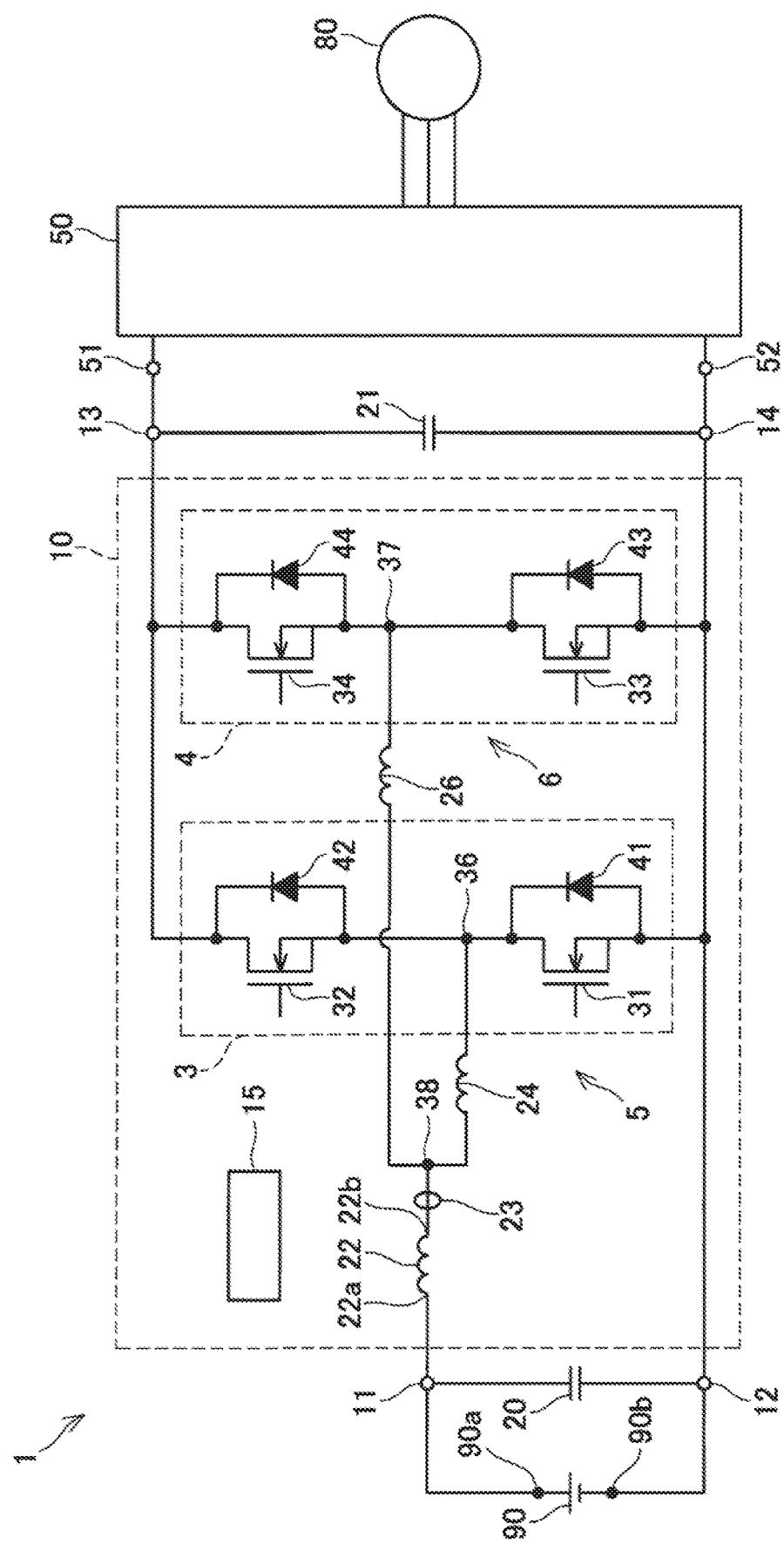
FIG. 1 is a circuit diagram of an electric vehicle including a bidirectional power converter according to a first embodiment.

A bidirectional power converter according to a first embodiment will be described below with reference to the accompanying drawings. The bidirectional power converter according to the first embodiment is adopted in an electric vehicle 1. FIG. 1 shows a circuit diagram of a drive system of the electric vehicle 1 including the bidirectional power converter according to the first embodiment. The bidirectional power converter in the first embodiment is a bidirectional voltage converter 10. A traveling motor 80 is driven with electric power from a battery 90 so that the electric vehicle 1 travels. The traveling motor 80 may generate electricity using inertial force of the vehicle. The battery 90 is charged with electric power generated by the traveling motor 80.

Hereinafter, to simplify the description, the traveling motor 80 will be simply referred to as a motor 80, and the bidirectional voltage converter 10 will be simply referred to as a voltage converter 10. In addition, a mode in which a current flows from the battery 90 to the motor 80 is referred to as a power running mode, and a mode in which a current flows from the motor 80 to the battery 90 is referred to as a regeneration mode.

The voltage converter 10 and an inverter 50 are connected between the battery 90 and the motor 80. A low-voltage positive terminal 11 of the voltage converter 10 is connected to a positive terminal 90a of the battery 90, and a low-voltage negative terminal 12 of the voltage converter 10 is connected to a negative terminal 90b of the battery 90. A high-voltage positive terminal 13 of the voltage converter 10 is connected to a direct-current (DC) positive terminal 51 of the inverter 50, and a high-voltage negative terminal 14 of the voltage converter 10 is connected to a direct-current (DC) negative terminal 52 of the inverter 50. An alternating-current (AC) end of the inverter 50 is connected to the motor 80.

The voltage converter 10 has a function of boosting a voltage output from the battery 90 to supply the voltage to the inverter 50 and a function of stepping down a voltage of regenerative power output from the inverter 50 to supply the power to the battery 90. That is, in the voltage converter 10, there are cases where a current flows from the low-voltage positive terminal 11 toward the high-voltage positive terminal 13, and where a current flows from the high-voltage positive terminal 13 toward the low-voltage positive terminal 11.

The inverter 50 has a function of converting the power from the battery 90, whose voltage has been boosted by the voltage converter 10, into an AC power to supply the AC power to the motor 80, and a function of converting regenerative power generated by the motor 80 into a DC power to supply the DC power to the voltage converter 10.

The voltage converter 10 will be described below. The voltage converter 10 includes a main reactor 22, two sub-circuits 5, 6, a current sensor 23, and a controller 15. A first end 22a of the main reactor 22 is connected to the low-voltage positive terminal 11. The two sub-circuits 5, 6 are connected in parallel between a second end 22b of the main reactor 22 and the high-voltage positive terminal 13. The low-voltage negative terminal 12 and the high-voltage negative terminal 14 are directly connected to each other. The current sensor 23 is connected to the second end 22b of the main reactor 22, and measures a current flowing through the main reactor 22. A measurement value of the current sensor 23 indicates a direction in which the current flows.

A filter capacitor 20 is connected between the low-voltage positive terminal 11 and the low-voltage negative terminal 12, and a smoothing capacitor 21 is connected between the high-voltage positive terminal 13 and the high-voltage negative terminal 14.

The first sub-circuit 5 includes two switching elements (an upper switching element 32 and a lower switching element 31), two diodes (an upper diode 42 and a lower diode 41), and a sub-reactor 24. The upper switching element 32 and the lower switching element 31 are connected in series between the high-voltage positive terminal 13 and the high-voltage negative terminal 14. The upper switching element 32 and the lower switching element 31 are connected so that a direction from the high-voltage positive terminal 13 to the high-voltage negative terminal 14 is a forward direction. The upper switching element 32 is disposed closer to the high-voltage positive terminal 13, and the lower switching element 31 is disposed closer to the high-voltage negative terminal 14. In other words, the upper switching element 32 is connected to the high-voltage positive terminal 13, and the lower switching element 31 is connected between the upper switching element 32 and the high-voltage negative terminal 14.

The upper diode 42 is in antiparallel connection with the upper switching element 32, and the lower diode 41 is in antiparallel connection with the lower switching element 31. In other words, the upper diode 42 and the lower diode 41 are connected so that the direction from the high-voltage negative terminal 14 to the high-voltage positive terminal 13 is the forward direction.

Both the upper switching element 32 and the lower switching element 31 are n-channel metal oxide semiconductor field effect transistors (MOSFETs). A drain of the upper switching element 32 is connected to the high-voltage positive terminal 13. A source of the upper switching element 32 is connected to a drain of the lower switching element 31. A source of the lower switching element 31 is connected to the high-voltage negative terminal 14. The upper switching element 32 and the lower switching element 31 may be power elements of a different type (e.g., insulated gate bipolar transistors (IGBTs)).

Reference character 36 denotes a midpoint (first midpoint 36) of a series connection between the upper switching element 32 and the lower switching element 31. A first end of the sub-reactor 24 is connected to the second end 22b of the main reactor 22, and a second end of the sub-reactor 24 is connected to the first midpoint 36. The sub-reactor 24 has an inductance smaller than that of the main reactor 22. The main reactor 22 accumulates electrical energy and outputs a current with electromagnetic induction effect. Therefore, a large inductance is required of the main reactor 22. In contrast, the sub-reactor 24 is intended to reduce a loss due to reverse recovery currents of the upper diode 42 and the lower diode 41, and has a function of maintaining a rate of change in current low when a small current flows. Thus, the sub-reactor 24 only needs to change the inductance when the current is small, and to have a small inductance that is smaller than that of the main reactor 22. However, the sub-reactor 24 also generates an induced electromotive force due to the electromagnetic induction effect.

The second sub-circuit 6 has the same structure as that of the first sub-circuit 5. The second sub-circuit 6 includes two switching elements (an upper switching element 34 and a lower switching element 33), two diodes (an upper diode 44 and a lower diode 43), and a sub-reactor 26. The upper switching element 34, the lower switching element 33, the upper diode 44, the lower diode 43, and the sub-reactor 26 correspond to the upper switching element 32, the lower switching element 31, the upper diode 42, the lower diode 41, and the sub-reactor 24, respectively, of the first sub-circuit 5.

Reference character 37 in FIG. 1 denotes a midpoint (second midpoint 37) of a series connection between the upper switching element 34 and the lower switching element 33 of the second sub-circuit 6. In addition, reference character 38 denotes a branch point (branch point 38) from the second end 22b of the main reactor 22 to the first sub-circuit 5 and the second sub-circuit 6. The first midpoint 36 of the first sub-circuit 5, the second midpoint 37 of the second sub-circuit 6, and the branch point 38 will be mentioned in the description with reference to FIG. 2 and the subsequent drawings.

A dashed line indicated by reference character 3 in FIG. 1 represents a semiconductor module. That is, the upper switching element 32, the lower switching element 31, the upper diode 42, and the lower diode 41 in the first sub-circuit 5 are contained in a single package (semiconductor module 3). Similarly, the upper switching element 34, the lower switching element 33, the upper diode 44, and the lower diode 43 in the second sub-circuit 6 are contained in a single package (semiconductor module 4). The semiconductor modules 3, 4 will be described later.

The first sub-circuit 5 and the main reactor 22 constitute a bidirectional voltage converter. The second sub-circuit 6 is connected in parallel with the first sub-circuit 5. The second sub-circuit 6 and the main reactor 22 also constitute a bidirectional voltage converter. Thus, the voltage converter 10 is a parallel circuit in which the two bidirectional voltage converters (sub-circuits 5, 6) that share the main reactor 22 are connected in parallel. By connecting the two bidirectional voltage converters (sub-circuits 5, 6) in parallel, it is possible to reduce a load on each switching element. The parallel circuit including the two bidirectional voltage converters (sub-circuits 5, 6) functions as a single bidirectional voltage converter. As a result, the voltage converter 10 can increase an allowable power for the entire converter while maintaining the load on each switching element low.

The switching elements 31, 32 of the first sub-circuit 5 and the switching elements 33, 34 of the second sub-circuit 6 are controlled by the controller 15. After controlling the switching elements 31, 32 of the first sub-circuit 5, the controller 15 controls the switching elements 33, 34 of the second sub-circuit 6. Thereafter, the controller 15 controls the switching elements 31, 32 of the first sub-circuit 5 again. In other words, the controller 15 sequentially controls the sub-circuits 5, 6.

The controller 15 receives a target voltage ratio between the low-voltage positive terminal 11 and the high-voltage positive terminal 13 from a higher-level controller (not shown), and determines duty ratios of the switching elements 31 to 34 so that the target voltage ratio is achieved. The duty ratio of the upper switching element 32 is the same as the duty ratio of the upper switching element 34, and the duty ratio of the lower switching element 31 is the same as the duty ratio of the lower switching element 33.

The lower switching elements 31, 33 and the upper diodes 42, 44 are involved in a boosting operation, and the upper switching elements 32, 34 and the lower diodes 41, 43 are involved in a step-down operation.

A driving mode of the electric vehicle 1 is frequently switched between the power running mode and the regeneration mode by pedal operation of the driver. That is, a mode of the voltage converter 10 is frequently switched between a mode in which a current flows from the low-voltage positive terminal 11 to the high-voltage positive terminal 13 (power running mode) and a mode in which current flows from the high-voltage positive terminal 13 to the low-voltage positive terminal 11 (regeneration mode). In the voltage converter 10, the upper switching elements 32, 34 and the lower switching elements 31, 33 are alternately turned on and turned off so that the boosting operation and the step-down operation are passively switched from one to the other depending on a voltage balance between a low-voltage side and a high-voltage side. That is, when the voltage on the high-voltage side becomes higher than a target voltage, the current flows from the high-voltage positive terminal 13 to the low-voltage positive terminal 11, and when the voltage on the high-voltage side becomes lower than the target voltage, the current flows from the low-voltage positive terminal 11 to the high-voltage positive terminal 13. Next, on-off timings of the switching elements and a flow of the current will be described for each of the power running mode and the regeneration mode.

Figure 2:
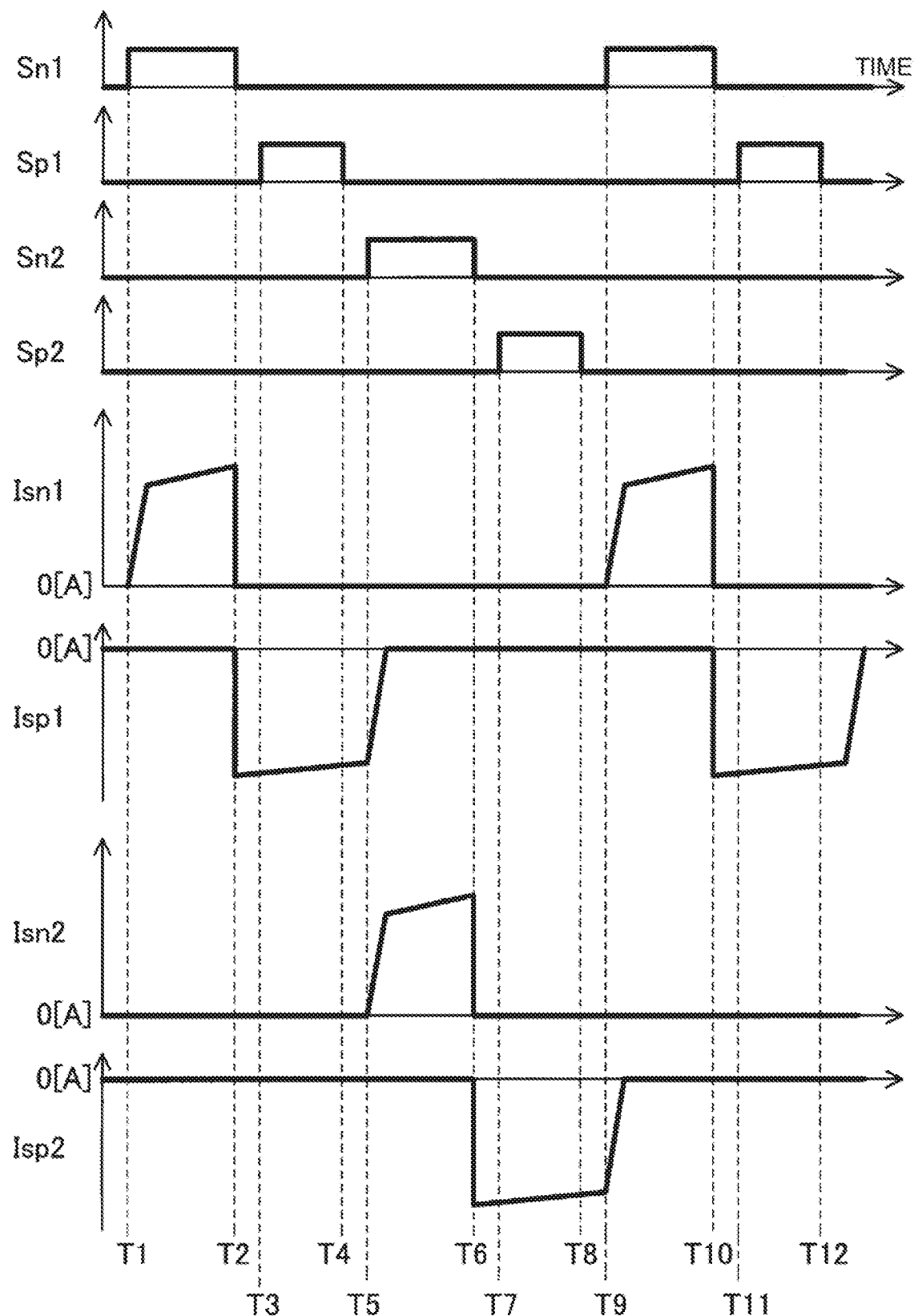
FIG. 2 is a timing chart for a power running mode (embodiment)
Figure 6:
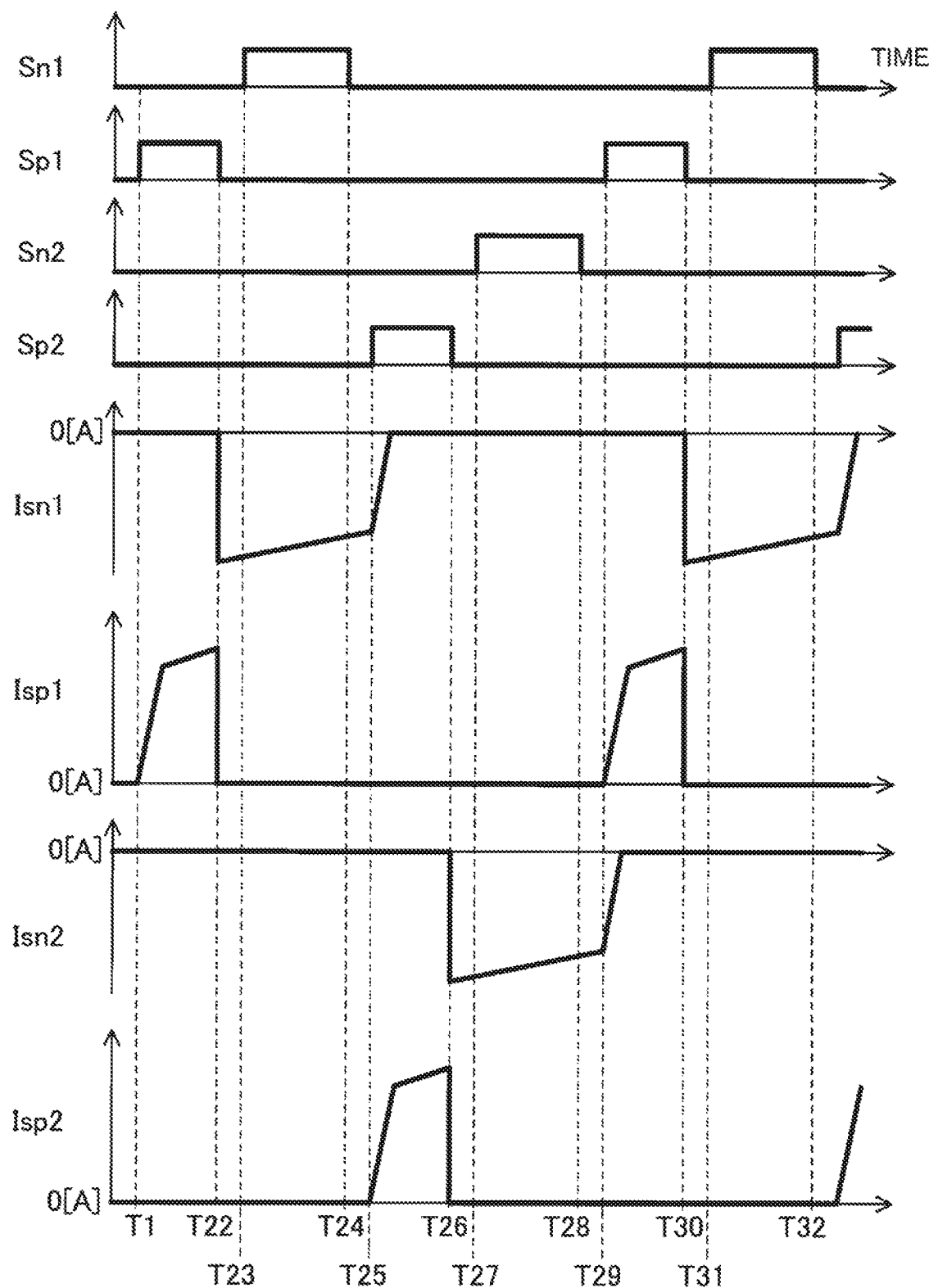
FIG. 6 is a timing chart for a regeneration mode (embodiment)
Figure 8:
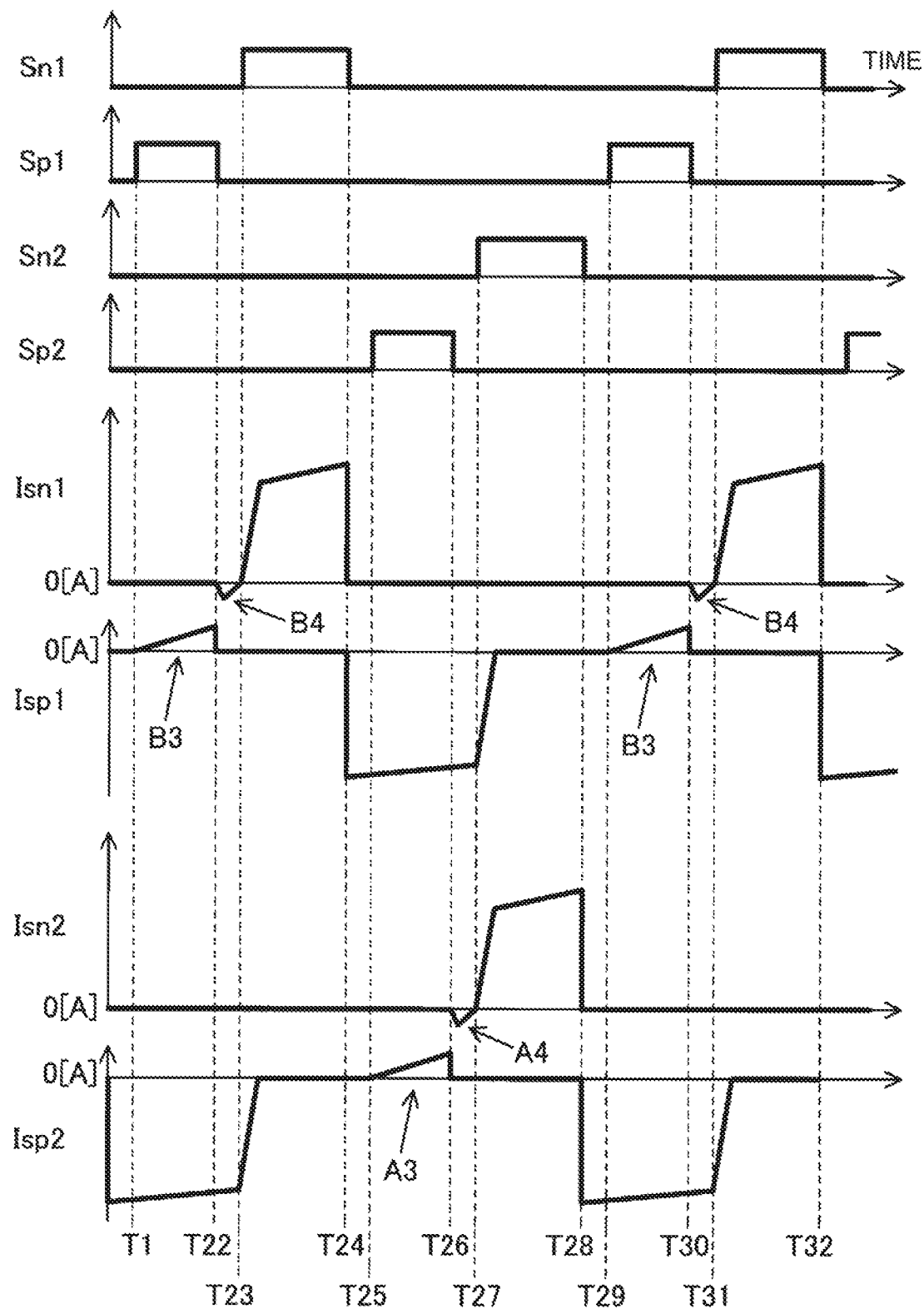
FIG. 8 is a timing chart for a power running mode (comparative example)

FIGS. 2 and 6 show timing charts regarding operations of the switching elements and the current flowing through the voltage converter 10. FIG. 2 is a timing chart for the power running mode, and FIG. 6 is a timing chart for the regeneration mode. Although described later, FIGS. 4 and 8 show timing charts regarding a comparative example.

In FIG. 2, reference character Sn1 denotes the lower switching element 31 of the first sub-circuit 5, and reference character Sp1 denotes the upper switching element 32 of the first sub-circuit 5. Reference character Sn2 denotes the lower switching element 33 of the second sub-circuit 6, and reference character Sp2 denotes the upper switching element 34 of the second sub-circuit 6. Reference character Isn1 denotes a current flowing between the first midpoint 36 and the low-voltage negative terminal 12. In other words, reference character Isn1 denotes a current flowing through the lower switching element 31 and/or the lower diode 41 of the first sub-circuit 5. Reference character Isp1 denotes a current flowing between the first midpoint 36 and the high-voltage positive terminal 13. In other words, reference character Isp1 denotes a current flowing through the upper switching element 32 and/or the upper diode 42 of the first sub-circuit 5. Reference character Isn2 denotes a current flowing between the second midpoint 37 and the low-voltage negative terminal 12, and reference character Isp2 denotes a current flowing between the second midpoint 37 and the high-voltage positive terminal 13. In each of graphs of the currents Isn1, Isp1, Isn2, and Isp2, the current flowing in the forward direction of the switching element (i.e., the direction from a collector toward an emitter) is shown as a positive value. For convenience of description, the currents Isn1 and Isp1 are referred to as a first lower current Isn1 and a first upper current Isp1, respectively, and the currents Isn2 and Isp2 are referred to as a second lower current Isp2 and a second upper current Isp2, respectively.

The controller 15 turns on and turns off the lower switching element 31 (Sn1) of the first sub-circuit 5, and then, turns on and turns off the upper switching element 32 (Sp1). After controlling the switching elements of the first sub-circuit 5, the controller 15 turns on and turns off the lower switching element 33 (Sn2) of the second sub-circuit 6 and turns on and turns off the upper switching element 34 (Sp2) of the second sub-circuit 6. A short interval is provided between an on-off operation of one switching element and an on-off operation of another switching element.

Figure 3A:
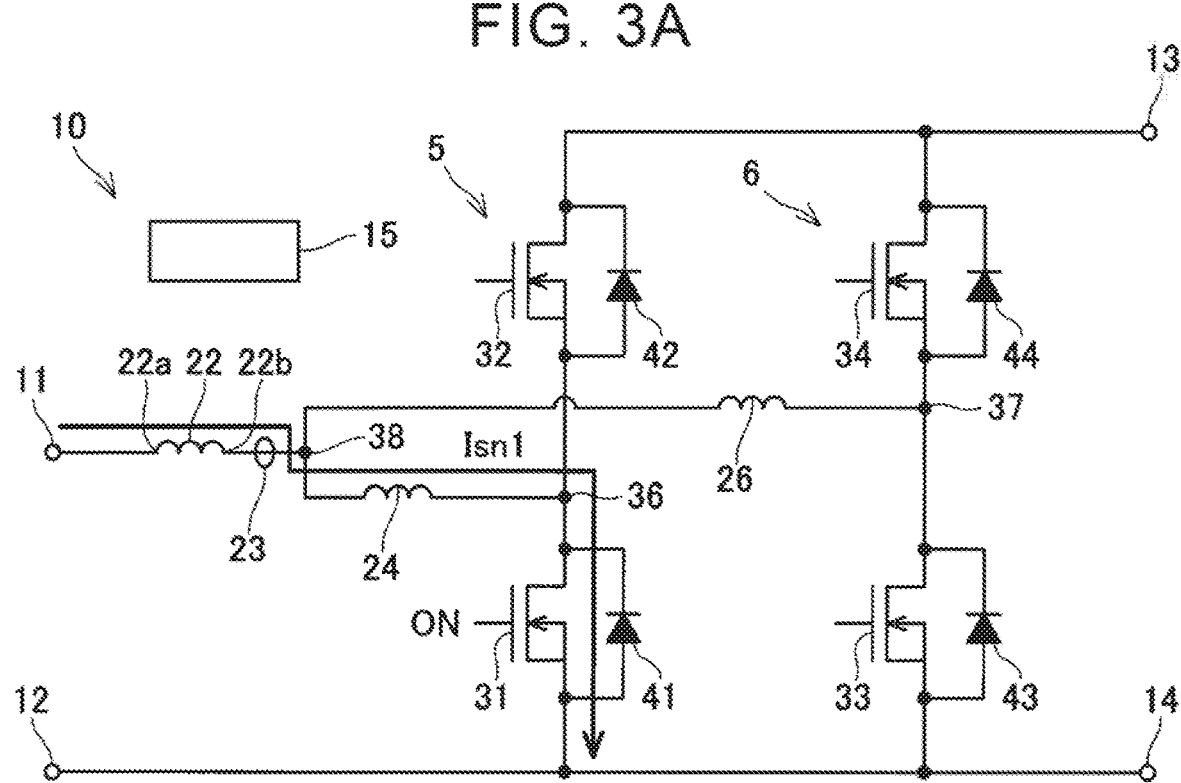
FIG. 3A is a circuit diagram illustrating a flow of current during the power running mode (embodiment)

More specifically, the operations of the switching elements and the flow of current will be described with reference to the timing chart in FIG. 2. The controller 15 turns on the lower switching element 31 (Sn1) at time T1 and turns off the lower switching element 31 at time T2. During a period between time T1 and time T2, the other switching elements are kept off. In the power running mode, when the lower switching element 31 (Sn1) is turned on, the current (first lower current Isn1) flows from the main reactor 22 to the lower switching element 31 (Sn1). The flow of the current at this time is shown in FIG. 3A. In FIG. 3A, a mark "ON" is provided near the lower switching element 31. In FIG. 3A, the switching elements that are not marked with "ON" are kept off. In FIGS. 5A, 5B, 7A, 7B, 9A, and 9B, the switching elements that are not marked with "ON" are kept off.

A thick arrow line in FIG. 3A indicates the flow of the first lower current Isn1. The first lower current Isn1 passes through the main reactor 22, the sub-reactor 24, the first midpoint 36, and the lower switching element 31, and returns to the negative terminal 90b of the battery 90 through the low-voltage negative terminal 12. At this time, magnetic energy is accumulated in the main reactor 22 and the sub-reactor 24.

A period from time T2 to time T3 in FIG. 2 is the interval, and all the switching elements are kept off during this interval. However, when the lower switching element 31 is turned off at time T2, the main reactor 22 and the sub-reactor 24 discharge the magnetic energy (that is, generate an induction electromotive force) and cause the current to continue to flow in the same direction. The current flowing from the first midpoint 36 toward the lower switching element 31 (the first lower current Isn1) is blocked at T2. Thereafter, the current flows from the first midpoint 36 toward the high-voltage positive terminal 13 through the upper diode 42. That is, the first lower current Isn1 becomes zero at time T2, and the first upper current Isp1 is present at T2 and thereafter. The first upper current Isp1 flows from the low-voltage positive terminal 11 toward the high-voltage positive terminal 13.

Figure 3B:
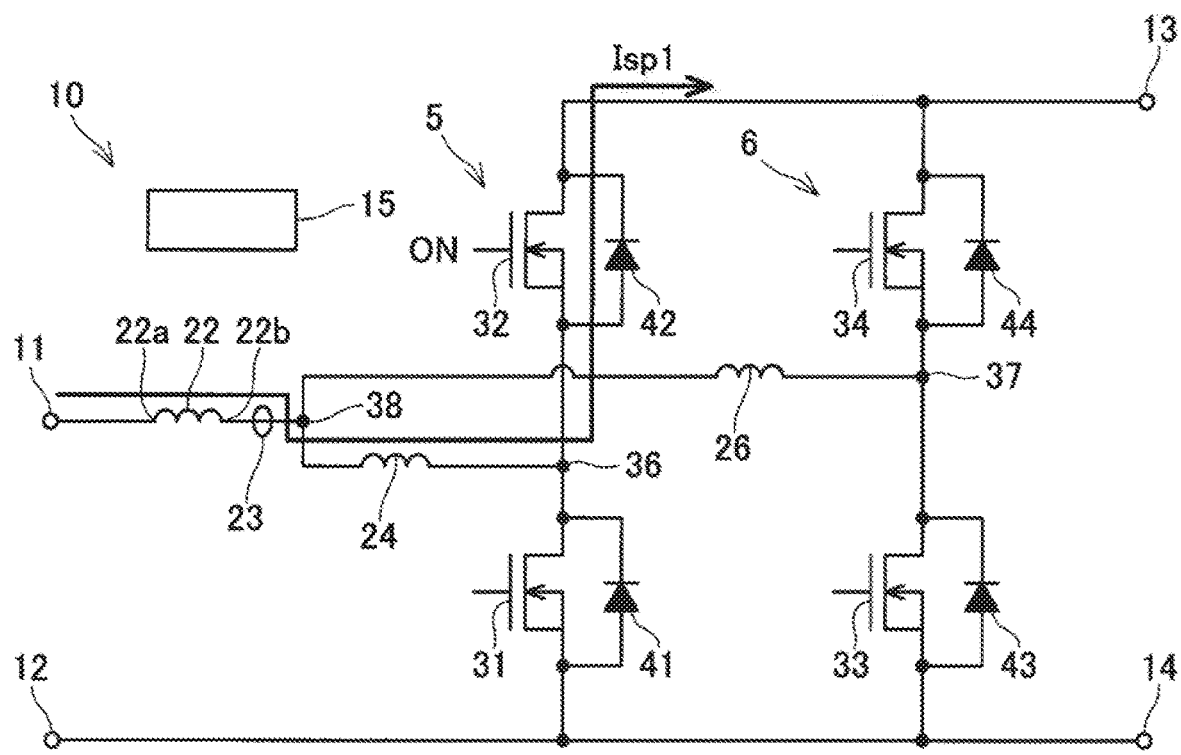
FIG. 3B is a circuit diagram illustrating the flow of current during the power running mode (embodiment)

The upper switching element 32 (Sp1) is turned on at time T3. The current based on the induction electromotive force of the main reactor 22 and the sub-reactor 24 has originally been flowing through the upper diode 42 (first upper current Isp1). When the upper switching element 32 (Sp1) is turned on, part of the first upper current Isp1 is shifted from the upper diode 42 to the upper switching element 32. However, the total amount of current flowing from the first midpoint 36 to the high-voltage positive terminal 13 does not change. The flow of the current (first upper current Isp1) at this time is shown in FIG. 3B. The first upper current Isp1 flows from the low-voltage positive terminal 11 to the high-voltage positive terminal 13 through the main reactor 22, the sub-reactor 24, the first midpoint 36, and the upper diode 42 (or the upper switching element 32). Part of the current based on the induction electromotive force of the main reactor 22 can flow to the high-voltage positive terminal 13 through the sub-reactor 26, the second midpoint 37, and the upper diode 44, although the total amount of current flowing to the high-voltage positive terminal 13 does not change. In FIGS. 3A and 3B, the current flowing through the second midpoint 37 is not shown.

The upper switching element 32 (Sp1) is turned off at time T4. The lower switching element 33 (Sn2) of the second sub-circuit 6 is turned on at time T5. When the lower switching element 33 (Sn2) is turned on, the second lower current Isn2 starts flowing and the first upper current Isp1 decreases. When the first upper current Isp1 becomes zero, the reverse recovery current flows through the upper diode 42 from a cathode toward an anode. However, the current (return current) flowing from the upper diode 42 into the lower switching element 33 (Sn2) through the first midpoint 36, the branch point 38, and the second midpoint 37 is restricted by the inductances of the sub-reactors 24, 26. The restriction of the return current is an effect provided by the sub-reactors 24, 26.

The second lower current Isn2 flows to the low-voltage negative terminal 12 through the main reactor 22, the sub-reactor 26, the second midpoint 37, and the lower switching element 33. At this time, magnetic energy is accumulated in the main reactor 22 and the sub-reactor 26. The controller 15 turns off the lower switching element 33 (Sn2) at time T6. When the lower switching element 33 (Sn2) is turned off, the second lower current Isn2 is blocked. The induction electromotive force is generated by the magnetic energy of the main reactor 22 and the sub-reactor 26, and the current continues to flow from the first end 22a of the main reactor 22 toward the second end 22b. The current (second lower current Isn2) flowing from the second midpoint 37 toward the lower switching element 33 (Sn2) is blocked, and flows from the second midpoint 37 to the high-voltage positive terminal 13 through the upper diode 44. This current serves as the second upper current Isp2.

Subsequently, the controller 15 turns on the upper switching element 34 (Sp2) at time T7. At time T7 and thereafter, part of the current flowing through the upper diode 44 shifts to the upper switching element 34 (Sp2), although the total amount of current flowing from the second midpoint 37 to the high-voltage positive terminal 13 does not change. Part of the current based on the induction electromotive force of the main reactor 22 can flow to the high-voltage positive terminal 13 through the sub-reactor 24, the first midpoint 36, and the upper diode 42. However, the total amount of current flowing to the high-voltage positive terminal 13 does not change.

Next, when the upper switching element 34 (Sp2) is turned off at time T8 and then the lower switching element 31 (Sn1) of the first sub-circuit 5 is turned on at time T9, the second upper current Isp2 decreases. When the second current Isp2 becomes zero, a reverse recovery current flows through the upper diode 44. The inductances of the sub-reactors 24, 26 restrain the reverse recovery current of the upper diode 44 from flowing into the first sub-circuit 5. This is the effect provided by the sub-reactors 24, 26.

Figure 5A:
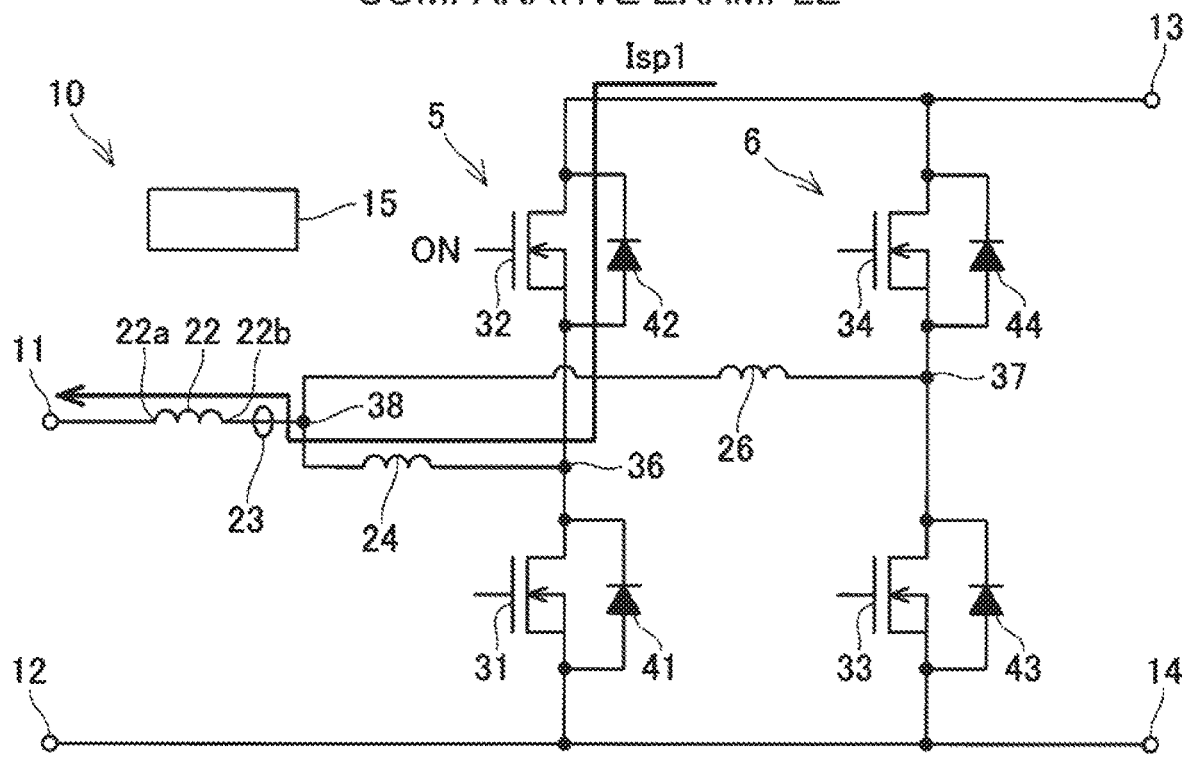
FIG. 5A is a circuit diagram illustrating a flow of current during the regeneration mode (comparative example)
Figure 5B:
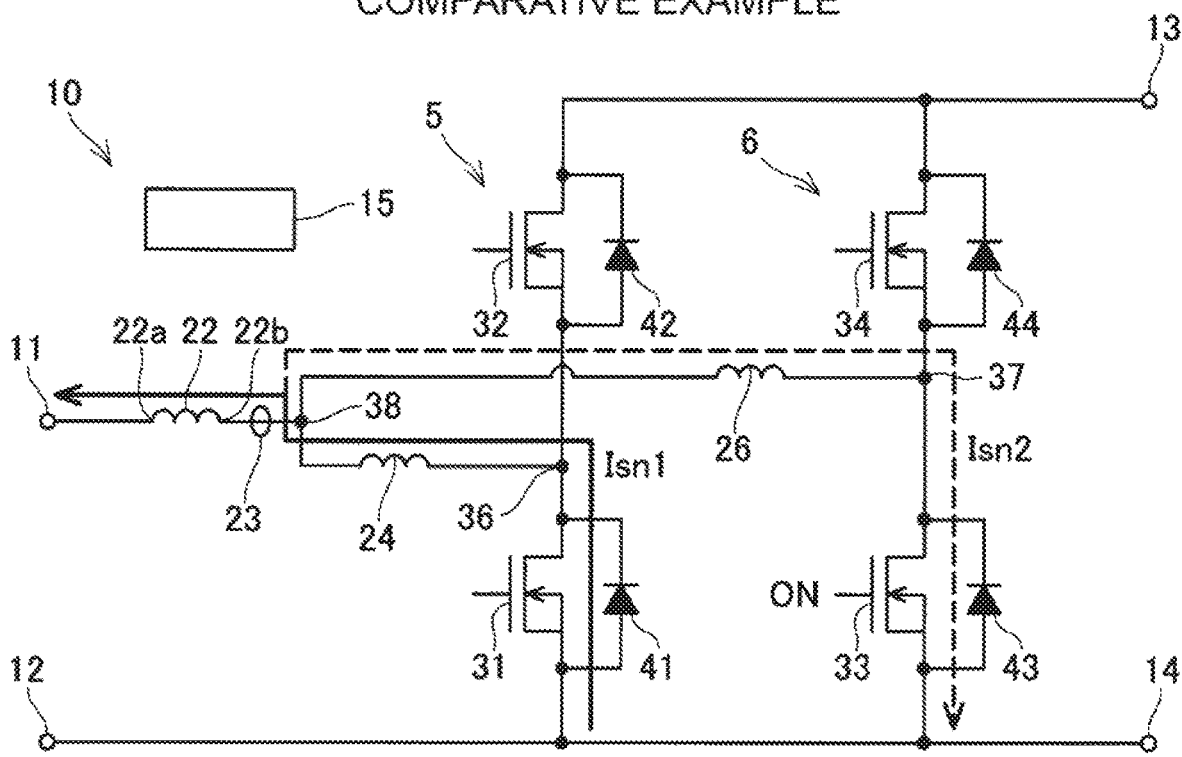
FIG. 5B is a circuit diagram illustrating the flow of current during the regeneration mode (comparative example)

In the case of FIG. 2, the controller 15 turns on and turns off the lower switching element 31 (Sn1) of the first sub-circuit 5, and then, turns on and turns off the upper switching element 32 (Sp1) of the first sub-circuit 5. Subsequently, the controller 15 turns on and turns off the lower switching element 33 (Sn2) of the second sub-circuit 6, and then, turns on and turns off the upper switching element 34 (Sp2). FIG. 4 shows a timing chart for a case in which the mode is changed from the power running mode to the regeneration mode while the on-off operations of the switching elements are repeatedly performed in the above order. That is, in the timing chart of FIG. 4, the current flows from the high-voltage positive terminal 13 to the low-voltage positive terminal 11. The on-off timings of the switching elements in FIG. 4 (graphs Sn1, Sp1, Sn2, Sp2) are the same as those in the case shown in FIG. 2. It should be noted that FIGS. 4, 5A, and 5B are reference diagrams (showing a comparative example) and do not show the operation of the voltage converter 10.

Here, the description is started from time T3. The controller 15 turns on the upper switching element 32 (Sp1) of the first sub-circuit 5 at time T3. The flow of the current at this time is shown in FIG. 5A. The thick arrow line indicates the flow of the first upper current Isp1. The first upper current Isp1 flows from the high-voltage positive terminal 13 toward the low-voltage positive terminal 11. The first upper current Isp1 passes through the upper switching element 32 (Sp1) and the first midpoint 36 and flows through the sub-reactor 24 and the main reactor 22. At this time, magnetic energy is accumulated in the main reactor 22 and the sub-reactor 24.

The controller 15 turns off the upper switching element 32 (Sp1) at time T4. The current (first upper current Isp1) flowing from the high-voltage positive terminal 13 to the sub-reactor 24 and the main reactor 22 through the upper switching element 32 (Sp1) is blocked. The main reactor 22 and the sub-reactor 24 discharge magnetic energy so that an induction electromotive force is generated. The induction electromotive force causes the current to flow in the direction from the second end 22b of the main reactor 22 to the first end 22a. Therefore, the first lower current Isn1 flows from the low-voltage negative terminal 12 through the lower diode 41, the first midpoint 36, and the sub-reactor 24. The first lower current Isn1 flows to the low-voltage positive terminal 11 through the main reactor 22.

While the first lower current Isn1 is flowing, the controller 15 turns on the lower switching element 33 (Sn2) at time T5. Then, the second midpoint 37 is electrically connected to the low-voltage negative terminal 12 via the lower switching element 33 (Sn2). Therefore, the second midpoint 37 becomes at the same potential as the low-voltage negative terminal 12. Meanwhile, a potential of the branch point 38 is pushed up by the induction electromotive force of the sub-reactor 24 compared to the potential of the low-voltage negative terminal 12. Therefore, part of the first lower current Isn1 returns from the branch point 38 to the low-voltage negative terminal 12 through the sub-reactor 26, the second midpoint 37, and the lower switching element 33. FIG. 5B shows the flow of the current at this time. A thick solid arrow line indicates the flow of the first lower current Isn1. The thick dashed arrow line from the branch point 38 to the second midpoint 37 indicates a return current (second lower current Isn2). An arrow A1 in FIG. 4 indicates the return current. The current that flows to the low-voltage positive terminal 11 decreases by the amount of the return current. The return current may cause a loss. An arrow B1 in FIG. 4 indicates a return current that flows when the upper switching element 34 (Sp2) of the second sub-circuit 6 is turned on and turned off and then the lower switching element 31 (Sn1) of the first sub-circuit 5 is turned on.

Furthermore, the controller 15 turns off the lower switching element 33 (Sn2) at time T6. The return current (second lower current Isn2) flowing through the lower switching element 33 (Sn2) until time T6 is blocked. When the second lower current Isn2 is blocked, an induction electromotive force is generated in the sub-reactor 26, and the sub-reactor 26 attempts to cause a current to flow from the branch point 38 to the second midpoint 37 at time T6 and thereafter. The current flows through the upper diode 44. That is, at time T6 and thereafter, the second upper current Isp2 flows as a return current. An arrow A2 in FIG. 4 indicates the return current (second upper current Isp2). An arrow B2 in FIG. 4 indicates a return current that flows through the upper diode 42 immediately after the lower switching element 31 (Sn1) of the first sub-circuit 5 is turned on and turned off.

In the voltage converter 10 according to the embodiment, in the regeneration mode, that is, when the current flows from the high-voltage positive terminal 13 to the low-voltage positive terminal 11, the order of driving the switching elements is changed in order to restrict the return current described above. FIG. 6 shows a timing chart regarding the operations of the lower switching elements 31 to 34 in the regeneration mode. The controller 15 turns on and turns off the upper switching element 32 (Sp1) of the first sub-circuit 5, and then, turns on and turns off the lower switching element 31 (Sn1). Thereafter, the controller 15 turns on and turns off the upper switching element 34 (Sp2) of the second sub-circuit 6. The controller 15 sequentially controls the plurality of sub-circuits 5, 6, and turns on and turns off the upper switching element prior to the lower switching element in each sub-circuit.

Figure 7A:
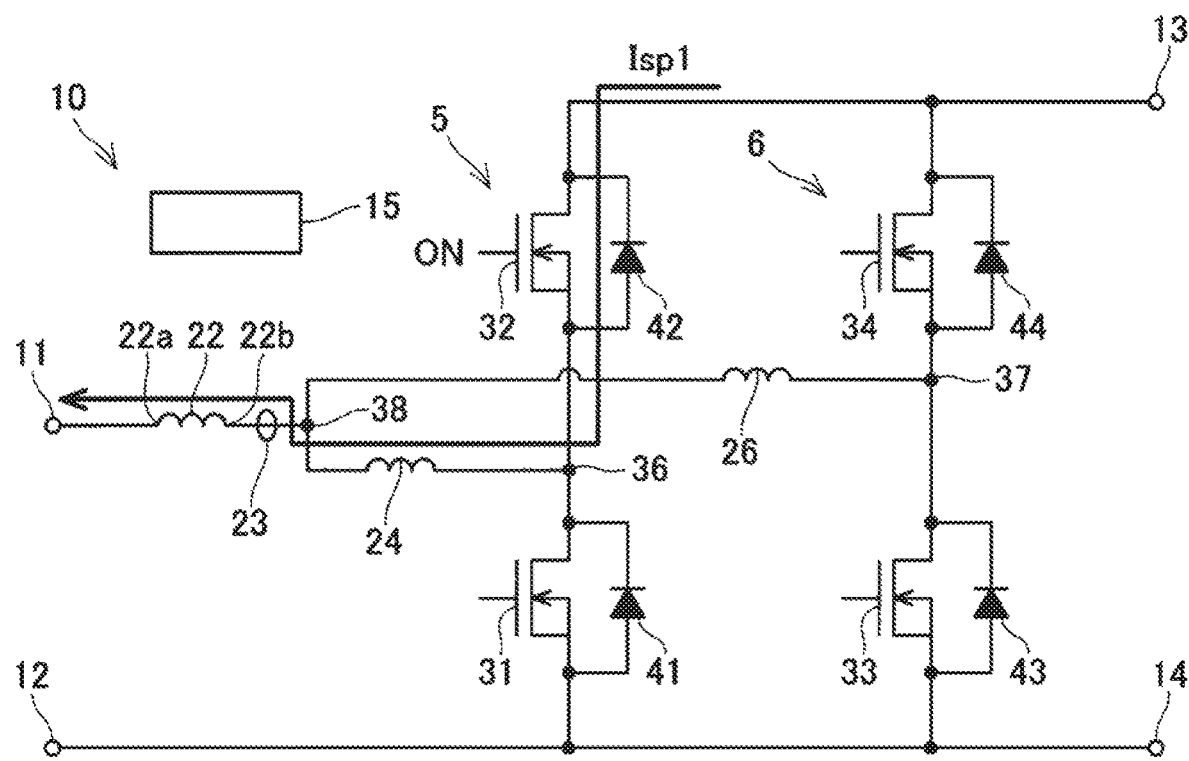
FIG. 7A is a circuit diagram illustrating a flow of current during the regeneration mode (embodiment)

As illustrated in FIG. 6, the controller 15 turns on the upper switching element 32 (Sp1) at time T1. In the regeneration mode, the current flows from the high-voltage positive terminal 13 to the low-voltage positive terminal 11 through the upper switching element 32 (Sp1), the first midpoint 36, the sub-reactor 24, and the main reactor 22 (first upper current Isp1). The flow of the current at this time is shown in FIG. 7A. FIG. 7A is the same as FIG. 5A.

The controller 15 turns off the upper switching element 32 (Sp1) at time T22. The current from the high-voltage positive terminal 13 is blocked. However, as described earlier, the main reactor 22 and the sub-reactor 24 generate an induction electromotive force, and the current continues to flow through the main reactor 22 and the sub-reactor 24. The current is supplied from the low-voltage negative terminal 12 through the lower diode 41 (Isn1).

Figure 7B:
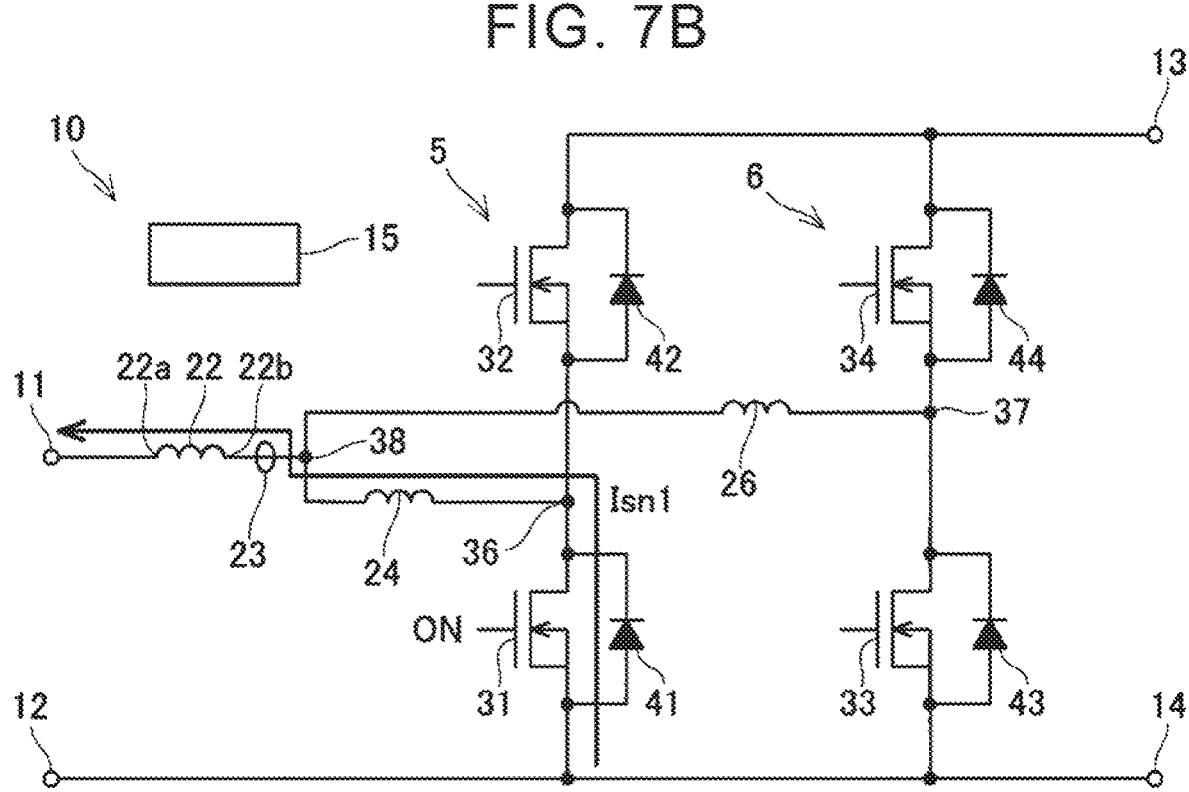
FIG. 7B is a circuit diagram illustrating the flow of current during the regeneration mode (embodiment)

Subsequently, the controller 15 turns on the lower switching element 31 (Sn1) at time T23. FIG. 7B shows the flow of the current at that time. When the lower switching element 31 (Sn1) is turned on, part of the current flowing through the lower diode 41 is shifted to the lower switching element 31 (Sn1). However, the total amount of current (that is, the first lower current Isn1) flowing from the low-voltage negative terminal 12 to the first midpoint 36 does not change. In addition, unlike the cases shown in FIGS. 4, 5A, and 5B, the lower switching element 33 is kept off. Thus, the return current described with reference to FIGS. 4, 5A, and 5B does not flow. The same applies to the case in which the upper switching element 34 (Sp2) of the second sub-circuit 6 is turned on and turned off and then the lower switching element 33 (Sn2) is turned on and turned off.

Next, the flow of the current that flows when the switching elements 31 to 34 are turned on and turned off in the power running mode at the same timings as those shown in FIG. 6 will be described as a reference example. FIG. 8 shows a timing chart. The timing chart for the switching elements 31 to 34 (Sn1, Sp1, Sn2, Sp2) is the same as that in FIG. 6.

Figure 9A:
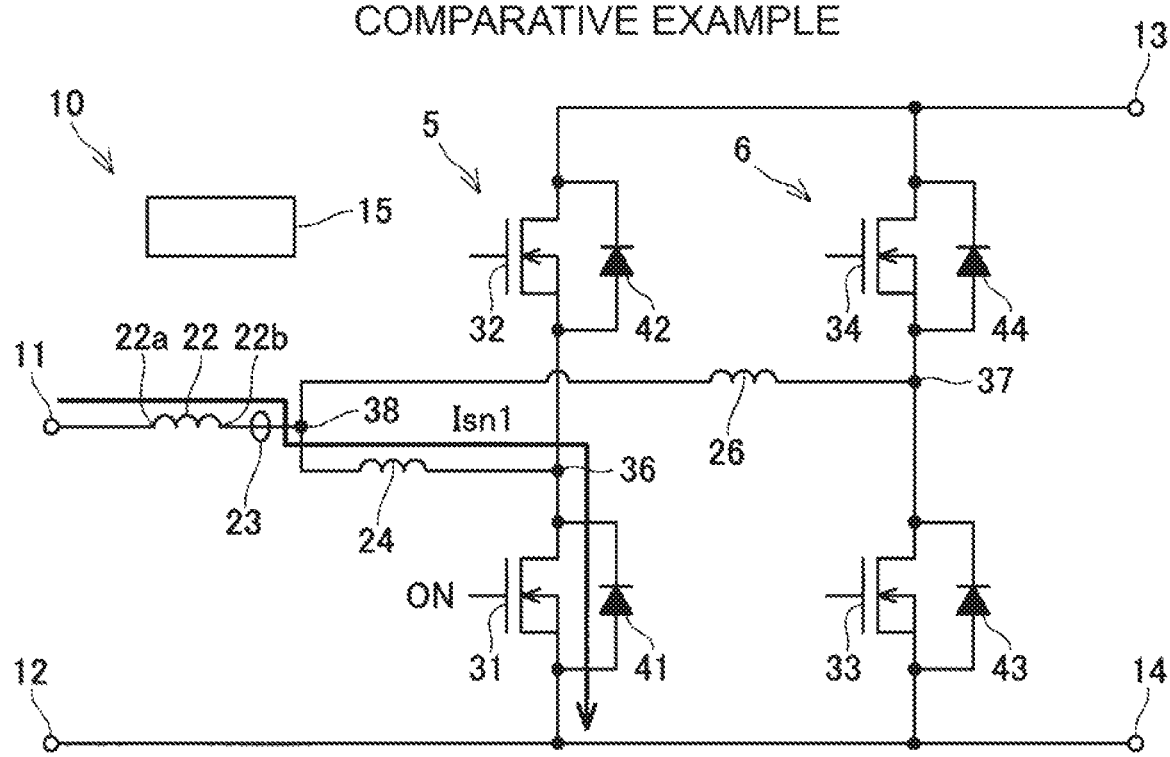
FIG. 9A is a circuit diagram illustrating a flow of current during the power running mode (comparative example)

Here, the description will be started from time T23. The controller 15 turns on the lower switching element 31 (Sn1) of the first sub-circuit 5 at time T23. In the power running mode, the current (Isn1) flows from the low-voltage positive terminal 11 to the low-voltage negative terminal 12 through the main reactor 22, the sub-reactor 24, the first midpoint 36, and the lower switching element 31 (Sn1). The flow of the current at that time is shown in FIG. 9A. FIG. 9A is the same as FIG. 3A.

Figure 9B:
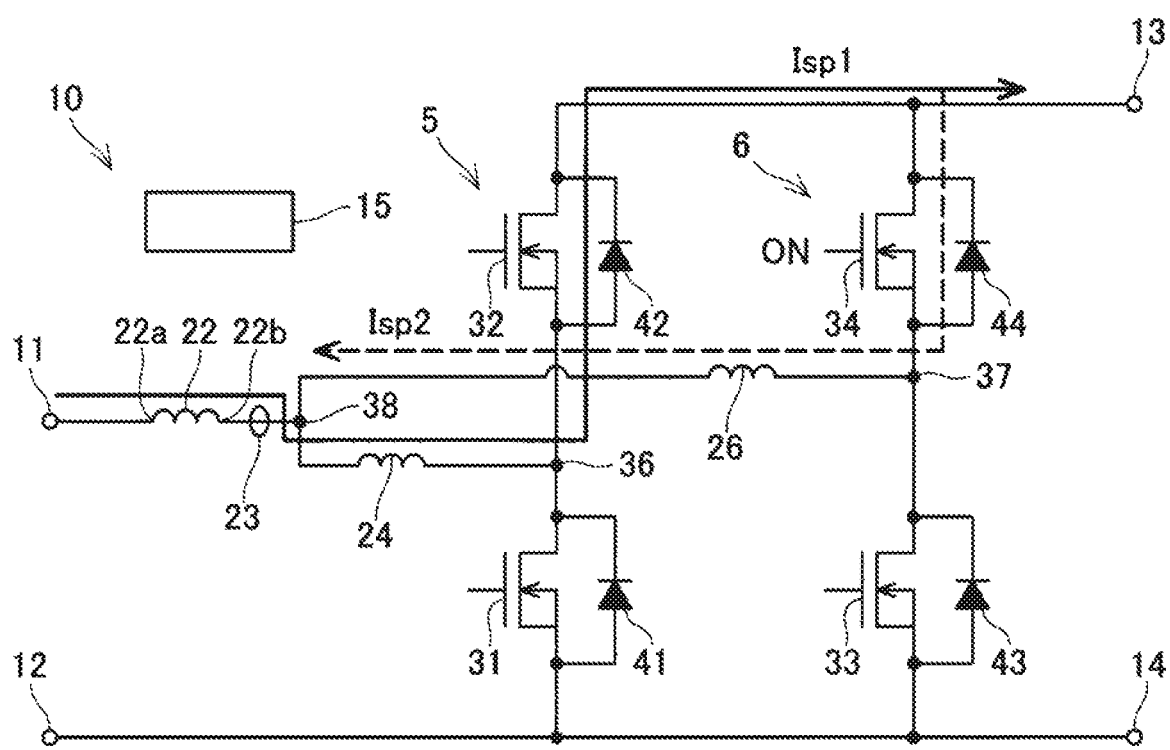
FIG. 9B is a circuit diagram illustrating the flow of current during the power running mode (comparative example)

The controller 15 turns off the lower switching element 31 (Sn1) at time T24. With the induction electromotive force of the main reactor 22 and the sub-reactor 24, the current flows from the low-voltage positive terminal 11 to the high-voltage positive terminal 13 through the upper diode 42 of the sub-circuit 5 (Isp1). The controller 15 turns on the upper switching element 34 (Sp2) of the second sub-circuit 6 at T25. The collector of the upper switching element 34 (Sp2) is electrically connected to the branch point 38 and has the same potential as that of the branch point 38. Meanwhile, with the induction electromotive force of the sub-reactor 24, the potential of the first midpoint 36 is pushed up to be higher than the potential of the branch point 38. As a result, part of the first upper current Isp1 returns to the branch point 38 through the upper switching element 34 (Sp2), the second midpoint 37, and the sub-reactor 26. FIG. 9B shows the flow of the current at that time. A thick solid arrow line indicates the flow of the first upper current Isp1. A thick dashed arrow line that branches from the solid line indicating the first upper current Isp1 and that goes toward the branch point 38 through the upper switching element 34 indicates a return current (second upper current Isp2). An arrow A3 in FIG. 8 indicates the return current. The current that flows to the high-voltage positive terminal 13 decreases by the amount of the return current. The return current may cause a loss. An arrow B3 in FIG. 8 indicates a return current that flows when the lower switching element 33 (Sn2) of the second sub-circuit 6 is turned on and turned off and then the upper switching element 32 (Sp1) of the first sub-circuit 5 is turned on.

Furthermore, the controller 15 turns off the upper switching element 34 (Sp2) at time T26. The return current (second upper current Isp2) flowing through the upper switching element 34 (Sp2) until time T26 is blocked. When the second upper current Isp2 is blocked, the induction electromotive force is generated in the sub-reactor 26, and the sub-reactor 26 attempts to cause a current to continue to flow from the second midpoint 37 to the branch point 38 at time T26 and thereafter. The current flows through the lower diode 43. That is, at time T26 and thereafter, the second lower current Isn2 flows as a return current. An arrow A4 in FIG. 8 indicates the return current (second lower current Isn2). An arrow B4 in FIG. 8 indicates a return current that flows through the lower diode 41 immediately after the upper switching element 32 (Sp1) of the first sub-circuit 5 is turned on and turned off.

As described with reference to FIGS. 2, 3A, and 3B, in the power running mode, the controller 15 turns on and turns off the lower switching element and then turns on and turns off the upper switching element in one sub-circuit, unlike in the regeneration mode. The controller 15 then turns on and turns off the lower switching element of a different sub-circuit. By driving the switching elements in such an order, the return current is restricted as illustrated in FIGS. 2, 3A, and 3B. The controller 15 specifies the direction in which the current flows (namely, whether the mode is the power running mode or the regeneration mode) with the current sensor 23 that measures the current flowing through the main reactor 22, and changes the order of driving the switching elements depending on the direction of the flow of the current. By changing the order of driving the switching elements, it is possible to restrict the return current regardless of in which direction the current flows.

Second Embodiment

Figure 10:
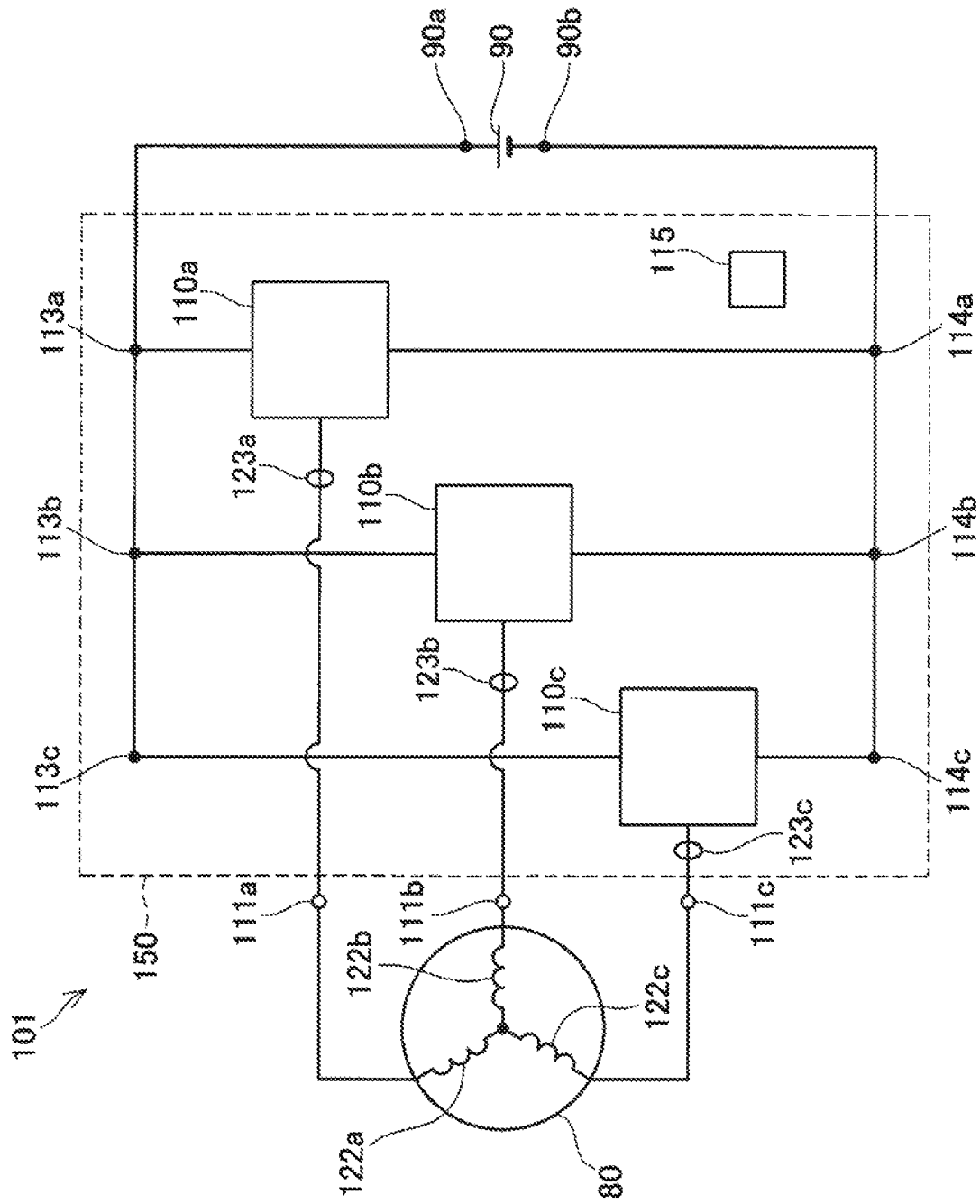
FIG. 10 is a block diagram illustrating an electric vehicle including a bidirectional power converter as an inverter (second embodiment)

The bidirectional power converter disclosed in the present specification can be applied to an inverter of an electric vehicle. The inverter is a device that changes DC power from the battery to a drive power (AC power) for the traveling motor. FIG. 10 shows a block diagram of an electric vehicle 101 including an inverter 150 in which the bidirectional power converter of the present embodiment is incorporated.

The electric vehicle 101 includes a battery 90, an inverter 150, and a traveling motor 80. The driving mode of the electric vehicle 101 is frequently switched between a power running mode and a regeneration mode by pedal operation of the driver.

The inverter 150 includes three power converters 110a, 110b, and 110c. The power converters 110a, 110b, and 110c are connected between the battery 90 and the motor 80. The motor 80 is a three-phase AC motor. Each of the power converters 110a, 110b, and 110c has a function of converting DC power from the battery 90 into AC power to supply the AC power to the motor 80, and a function of converting the regenerative power generated by the motor 80 (AC power) into DC power to supply the DC power to the battery 90. That is, the power converters 110a, 110b, and 110c are bidirectional power converters. The power converters 110a, 110b, and 110c are controlled by a controller 115 that is included in the inverter 150.

A DC positive terminal 113a of the power converter 110a is connected to the positive terminal 90a of the battery 90, and a DC negative terminal 114a of the power converter 110a is connected to the negative terminal 90b of the battery 90. An AC terminal 111a of the power converter 110a is connected to a stator coil 122a of the motor 80. The motor 80 includes three stator coils 122a, 122b, and 122c that are connected in a star connection (Y connection). A current sensor 123a is provided on an AC output line of the power converter 110a. The current sensor 123a measures a current flowing through the stator coil 122a. Based on a measurement value of the current sensor 123a, the controller 15 identifies the direction in which the current flows. Since the power converters 110b, 110c have the same structure as that of the power converter 110a, description thereof will be omitted.

The controller 115 controls 3 the power converters 110a to 110c based on a command from the higher-level controller, and causes the power converters 110a to 110c to respectively output AC power of a prescribed frequency. When the motor 80 is reversely driven from the output shaft side and rotated at a frequency higher than the frequency commanded by the controller 115, the motor 80 generates electric power and a current flows from the motor 80 to the power converters 110a to 110c.

Figure 11:
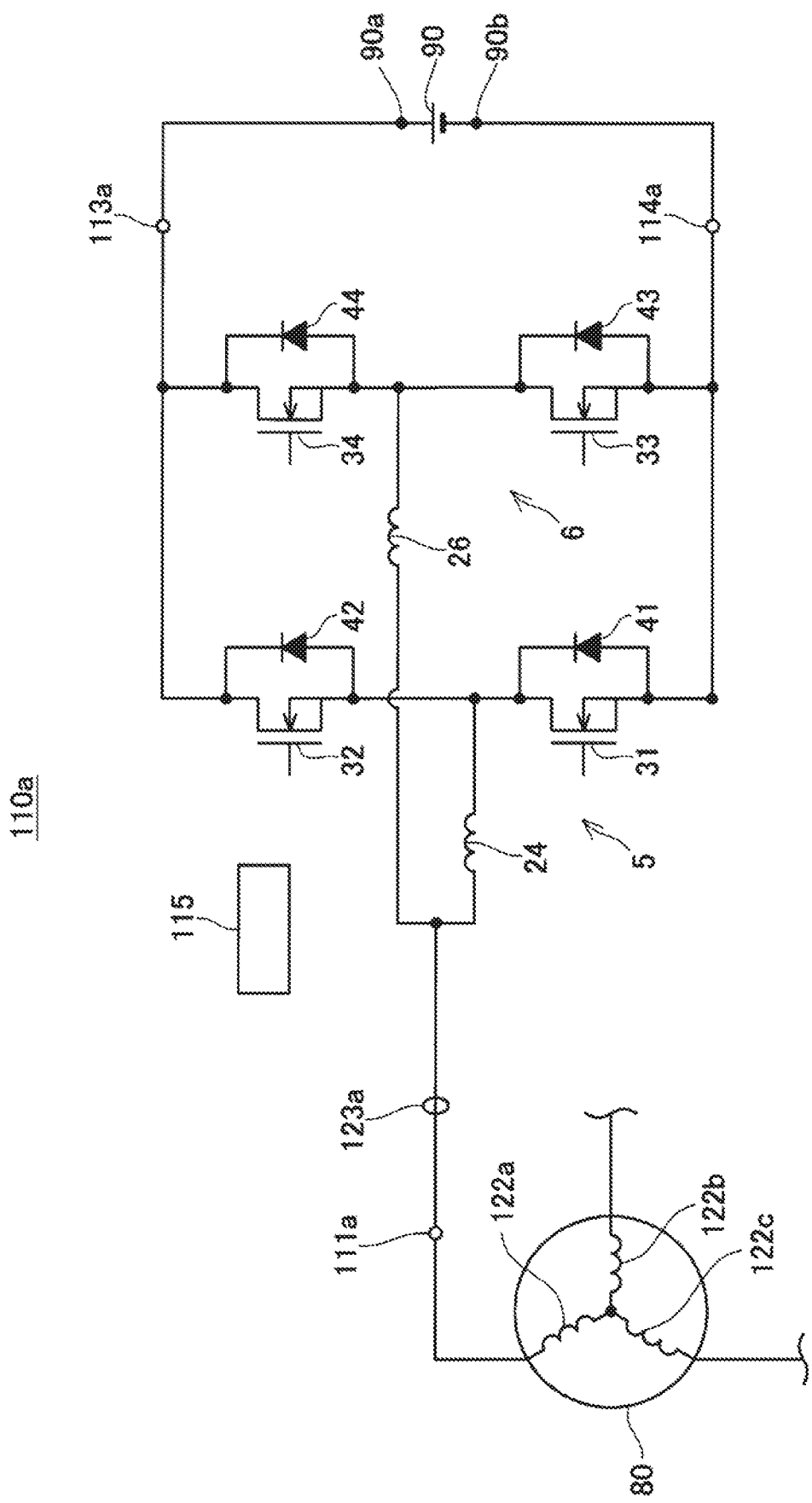
FIG. 11 is a circuit diagram of the power converter.

FIG. 11 shows a circuit diagram of the power converter 110a. The power converter 110a includes the DC positive terminal 113a and a plurality of sub-circuits 5, 6. The stator coil 122a of the motor 80 is a component of the motor 80, and also functions as a component of the power converter 110a together with the sub-circuits 5, 6. The power converters 110b, 110c that are connected to the stator coils 122b, 122c, respectively, of the motor 80 are not shown in FIG. 11.

The sub-circuits 5, 6 are connected in parallel between the DC positive terminal 113a and the stator coil 122a. The first sub-circuit 5 includes the lower switching element 31, the upper switching element 32, the lower diode 41, the upper diode 42, and the sub-reactor 24. The second sub-circuit 6 includes the lower switching element 33, the upper switching element 34, the lower diode 43, the upper diode 44, and the sub-reactor 26.

The structure of the inverter is well known, and the upper switching elements 32, 34 correspond to so-called upper arm switching elements, and the lower switching elements 31, 33 correspond to so-called lower arm switching elements.

As is clear by comparing FIG. 11 with FIGS. 1, 3A, and 3B, the power converter 110*a* has the same structure as that of the voltage converter 10 according to the first embodiment. Thus, like the controller 15 of the voltage converter 10, the controller 115 of the inverter 150 changes the order of driving the switching elements 31 to 34 depending on the direction of the current so as to restrict the return current.

Specifically, the controller 115 generates pulse-width modulation (PWM) signals with prescribed duty ratios based on commands from the higher-level controller (not shown). The controller 115 generates two types of PWM signals (a PWM signal for the upper switching elements and a PWM signal for the lower switching elements) such that the lower switching elements are off when the upper switching elements are on and the upper switching elements are off when the lower switching elements are off. The controller 115 transmits the two types of PWM signals alternately to the first sub-circuit 5 and the second sub-circuit 6. While the current is flowing from the DC positive terminal 113*a* toward the AC terminal 111*a*, the controller 115 sequentially supplies the sub-circuits 5, 6 with the PWM signals to turn on and turn off the lower switching element and then to turn on and turn off the upper switching element in each sub-circuit. While the current is flowing from the AC terminal 111*a* toward the DC positive terminal 113*a*, the controller 115 sequentially supplies the sub-circuits 5, 6 with the PWM signals to turn on and turn off the upper switching element and then turn on and turn off the lower switching element in each sub-circuit. By driving the switching elements 31 to 34 of the power converter 110*a* as described above, the return current flowing through the sub-circuits 5, 6 can be restricted as in the case of the voltage converter 10 according to the first embodiment. The same applies to the power converters 110*b*, 110*c*.

Figure 12:
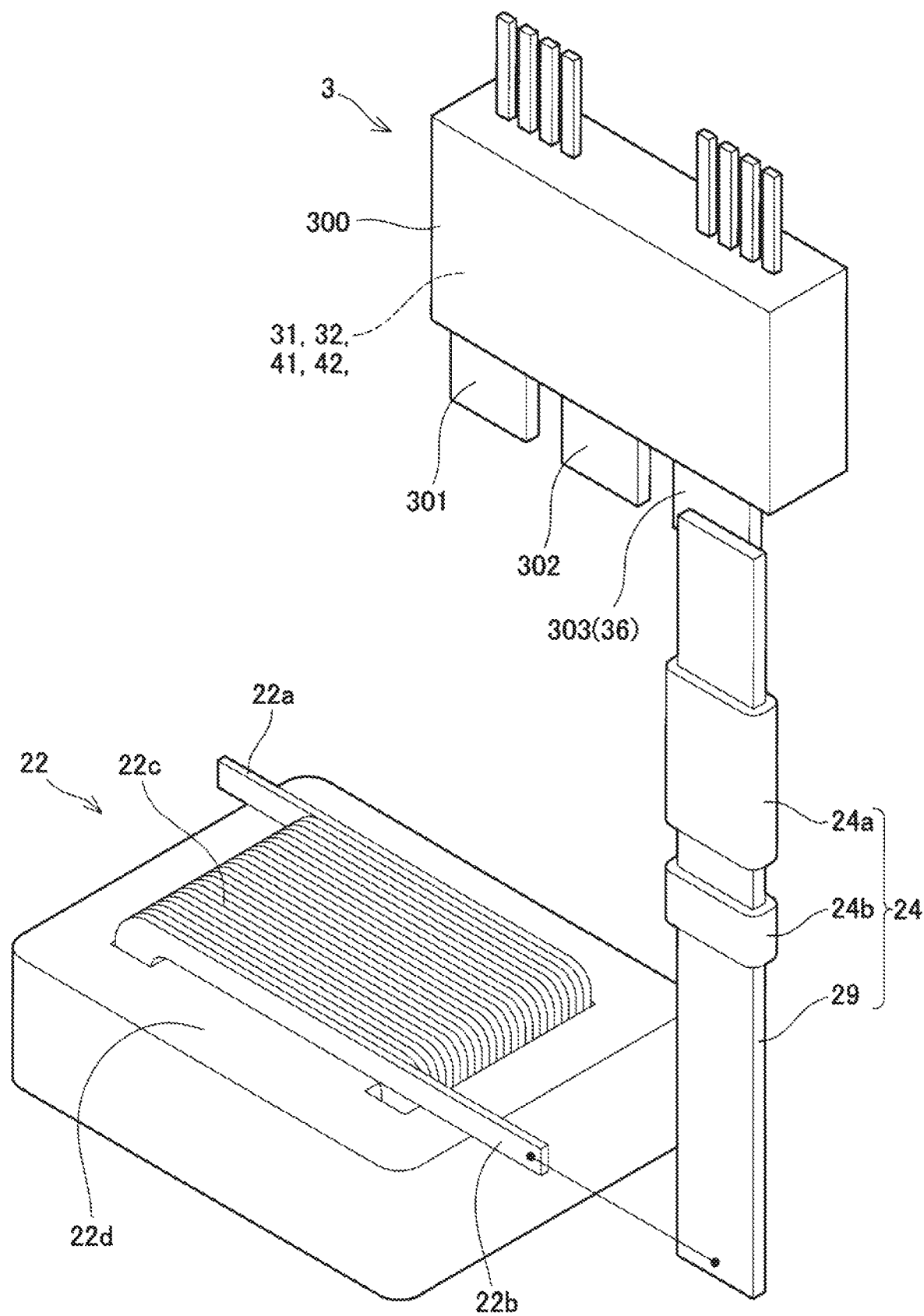
FIG. 12 is a diagram illustrating an example of a magnetic core of a sub-reactor.

A working example of the sub-reactor will be described below. As described above with reference to FIG. 1, the upper switching element 32, the lower switching element 31, the upper diode 42 and the lower diode 41 included in the first sub-circuit 5 are contained in a single semiconductor module 3. FIG. 12 shows an example of hardware of the semiconductor module 3 and the main reactor 22. A body of the semiconductor module 3 is a package 300 made from resin. The upper switching element 32, the lower switching element 31, the upper diode 42, and the lower diode 41 are sealed in the package 300. In the package 300, the upper switching element 32 and the lower switching element 31 are connected in series. In the package 300, the upper diode 42 is in antiparallel connection with the upper switching element 32, and the lower diode 41 is in antiparallel connection with the lower switching element 31. Three power terminals 301, 302, and 303 extend from the package 300. In the package 300, the power terminal 301 is connected to the high potential side in the series connection between the upper switching element 32 and the lower switching element 31, and the power terminal 302 is connected to the low potential side in the series connection. The power terminal 303 is connected to the midpoint (first midpoint 36) of the series connection between the upper switching element 32 and the lower switching element 31 in the package 300.

The main reactor 22 is composed of a magnetic core 22*d* and a winding 22*c* wound around the magnetic core 22*d*. A first end of the winding 22*c* (that is, the second end 22*b* of the main reactor 22) and the power terminal 303 (that is, the midpoint (first midpoint 36) of the series connection between the two switching elements 31, 32) are connected with a conductor 29. The conductor 29 is an elongated metal bar. The conductor 29 is surrounded by two magnetic cores (a first magnetic ring core 24*a* and a second magnetic ring core 24*b*). The first magnetic ring core 24*a*, the second magnetic ring core 24*b*, and the conductor 29 surrounded by the first and second magnetic ring cores 24*a*, 24*b* constitute the sub-reactor 24.

A first magnetic saturation current value at which the first magnetic ring core 24*a* reaches a magnetic saturation is different from a second magnetic saturation current value at which the second magnetic ring core 24*b* reaches a magnetic saturation. More specifically, the second magnetic ring core 24*b* is a saturable core (saturable reactor), and reaches the magnetic saturation with a small current, and the inductance thereof does not change thereafter. That is, the second magnetic saturation current value of the second magnetic ring core 24*b* is much smaller than the first magnetic saturation current value of the first magnetic ring core 24*a*.

The sub-reactor 24 is provided in order to restrict the reverse recovery current of the diodes of the sub-circuits. Therefore, the inductance of the sub-reactor 24 may vary significantly with a small current. Moreover, an inductance that does not vary with a large current has a smaller influence on conversion of power involving a large current, which is the main purpose of power conversion. The sub-reactor 24 formed by combining the saturable core (second magnetic ring core 24*b*) and the normal magnetic core (first magnetic ring core 24*a*) can restrict the reverse recovery current of the diodes and the return current between the sub-circuits without significantly affecting the power conversion.

In general, a saturable core made of an amorphous material or the like can be made smaller than usual cores. Moreover, by utilizing the conductor 29 that connects the semiconductor module 3 and the main reactor 22 as a winding of the sub-reactor 24, a compact sub-reactor can be achieved. The same applies to the sub-reactor 26 of the second sub-circuit 6.

Figure 13:
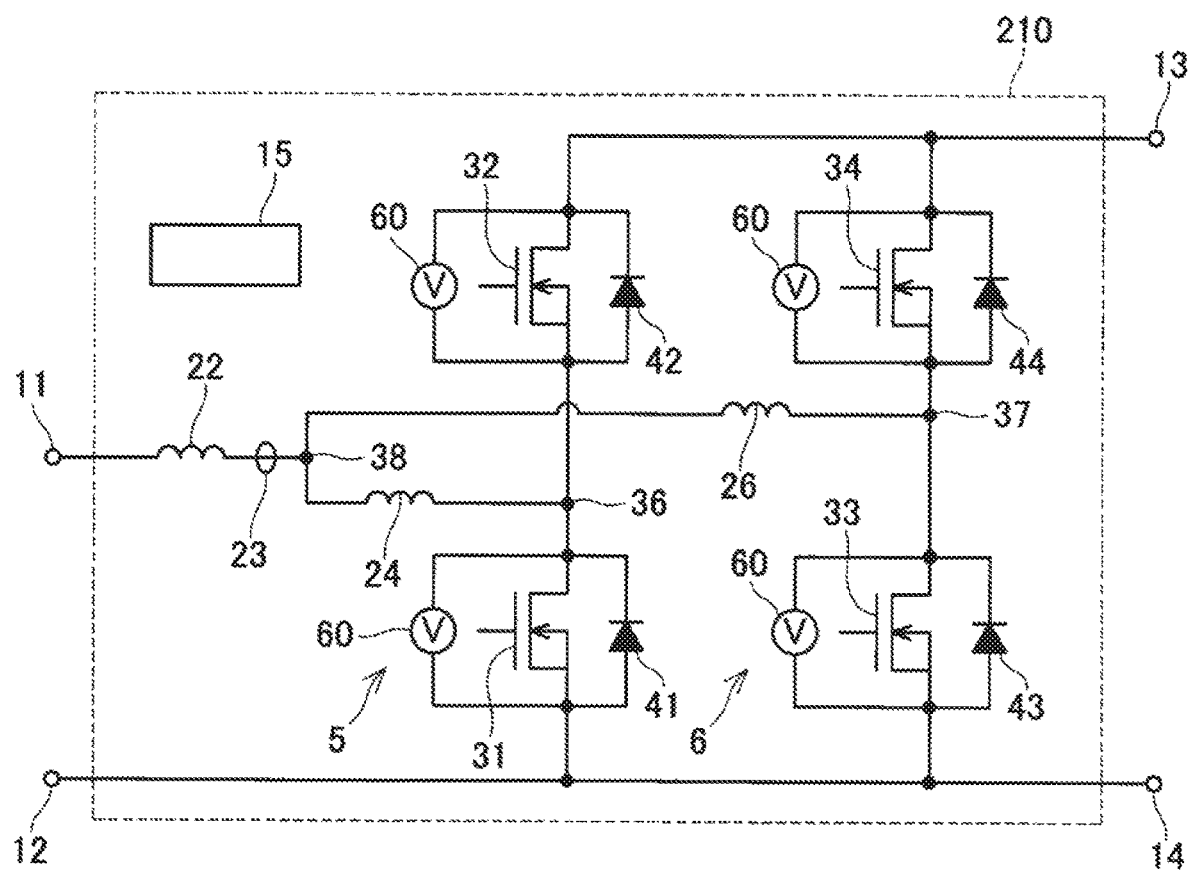
FIG. 13 is a circuit diagram of a power converter according to a modification.

Hereinafter, a supplementary description about the detection of the direction of the current will be provided. In the voltage converter 10 and the power converter 110*a* according to the embodiments, the direction of the current is detected by the current sensor. The current sensor of the power converter also measures a large current, and thus, may have low accuracy of measurement around zero where the measurement value changes between positive and negative. Thus, the direction of the current may be detected by measuring the voltage across the switching element. FIG. 13 shows a circuit diagram of a power converter 210 according to a modification. The configuration of the power converter 210 is the same as that of the voltage converter 10 according to the first embodiment except that the power converter 210 includes four voltage sensors 60. In the power converter 210 according to the modification, the voltage sensor 60 is provided for each of the switching elements 31 to 34. The voltage sensors 60 measure the individual voltages across the switching elements. The controller 15 determines the direction of the current flowing through the main reactor 22 based on the measured values of the voltage sensors 60.

Figure 14:
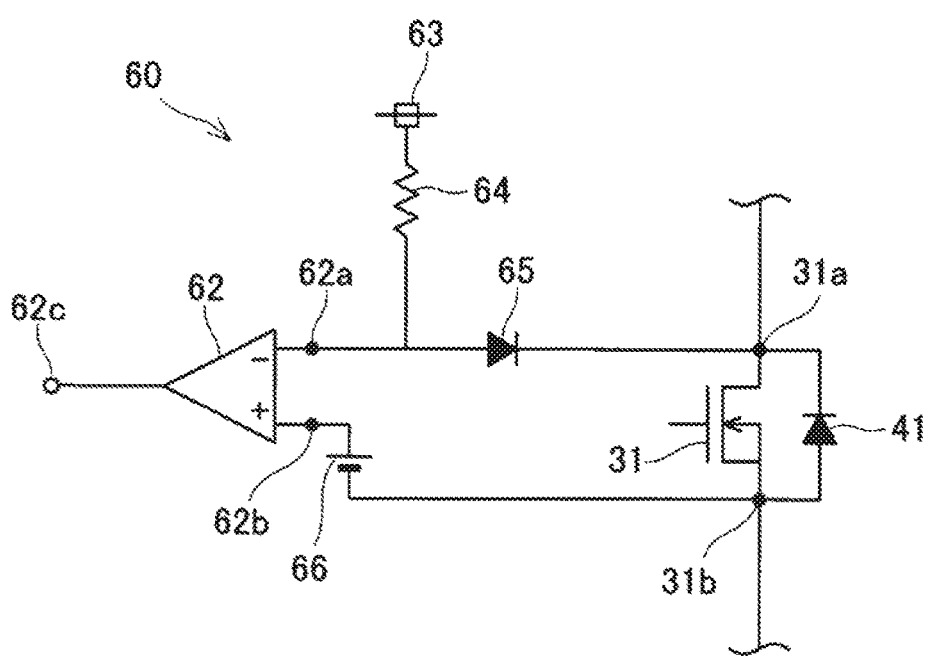
FIG. 14 is a circuit diagram of an exemplary voltage sensor.

The voltage sensor 60 may directly measure the voltage across the switching element, or may be a circuit that can detect only the direction of the current. FIG. 14 shows a circuit diagram of the voltage sensor 60 that detects the direction of the current across the switching element 31. The voltage sensor 60 includes an output terminal 61, a comparator 62, a reference voltage terminal 63, a resistor 64, a diode 65, and a battery 66.

A collector terminal 31a of the switching element 31 and a negative input end 62a of the comparator 62 are connected to each other via the diode 65. The collector terminal 31a corresponds to an upstream side of the switching element 31 in the forward direction, and an emitter terminal 31b corresponds to a downstream side of the switching element 31 in the forward direction. A cathode of the diode 65 is connected to the collector terminal 31a, and an anode of the diode 65 is connected to the comparator 62. The negative input end 62a of the comparator 62 is connected to the reference voltage terminal 63 via the resistor 64. The diode 65 inhibits the current from flowing from the collector terminal 31a toward the comparator 62.

The emitter terminal 31b of the switching element 31 is connected to a positive input end 62b of the comparator 62 via the battery 66. A negative electrode of the battery 66 is connected to the emitter terminal 31b, and a positive electrode of the battery 66 is connected to the comparator 62. The voltage of the reference voltage terminal 63 and the voltage of the battery 66 are selected such that the negative input end 62a and the positive input end 62b are at the same potential when the collector terminal 31a and the emitter terminal 31b are at the same potential.

According to the circuit in FIG. 14, when the potential of the collector terminal 31a of the switching element 31 is higher than the potential of the emitter terminal 31b, the potential of the output end 62c of the comparator 62 is kept at LOW potential. The wording "the potential of the collector terminal 31a is higher than the potential of the emitter terminal 31b" means that the current flows from the collector terminal 31a to the emitter terminal 31b through the switching element 31. When the potential of the collector terminal 31a of the switching element 31 is lower than the potential of the emitter terminal 31b, the potential of the output end 62c of the comparator 62 is kept at HIGH potential. The wording "the potential of the collector terminal 31a is lower than the potential of the emitter terminal 31b" means that the current flows from the emitter terminal 31b to the collector terminal 31a through the diode 41. The circuit shown in FIG. 14 can detect the direction of the current with high accuracy around zero current.

When the voltage sensor 60 having the circuit in FIG. 14 is used, it is desirable to identify the direction of the current based on an output immediately after the switching element to which the voltage sensor 60 is connected is switched from on to off.

Notes concerning the technique described in the embodiments will be described below. The features of the voltage converter 10 according to the first embodiment is as follows. The voltage converter 10 is connected between the battery 90 and the inverter 50 that allow input and output of electric power. The voltage converter 10 includes the high-voltage positive terminal 13, the low-voltage positive terminal 11, the high-voltage negative terminal 14, the main reactor 22, the sub-circuits 5, 6, and a controller 15. The high-voltage positive terminal 13 is connected to the DC positive terminal 51 serving as an input and output end of the inverter 50. The low-voltage positive terminal 11 is connected to the positive terminal 90a serving as an input and output end of the battery 90. The high-voltage negative terminal 14 is connected to the DC negative terminal 52 of the inverter 50. The high-voltage negative terminal 14 is directly connected to the low-voltage negative terminal 12.

The first end 22a of the main reactor 22 is connected to the low-voltage positive terminal 11. The sub-circuits 5, 6 are connected in parallel between the second end 22b of the main reactor 22 and the high-voltage positive terminal 13. The controller 15 sequentially controls the plurality of sub-circuits 5, 6. Sequentially controlling the plurality of sub-circuits means turning on and turning off the switching elements included in one circuit and then turning on and turning off the switching elements included in another circuit.

The first sub-circuit 5 includes the upper switching element 32, the lower switching element 31, the upper diode 42, the lower diode 41, and the sub-reactor 24. The upper switching element 32 is connected to the high-voltage positive terminal 13. The lower switching element 31 is connected between the upper switching element 32 and the high voltage negative terminal 14 (low-voltage negative terminal 12). The upper diode 42 is in antiparallel connection with the upper switching element 32, and the lower diode 41 is in antiparallel connection with the lower switching element 31. The sub-reactor 24 is connected between the second end 22b of the main reactor 22 and the first midpoint 36. The first midpoint 36 is the midpoint of the series connection between the upper switching element 32 and the lower switching element 31. The second sub-circuit 6 has the same circuit structure as the first sub-circuit 5.

While the current is flowing from the low-voltage positive terminal 11 toward the high-voltage positive terminal 13, the controller 15 turns on and turns off the lower switching element and then turns on and turns off the upper switching element in each of the sub-circuits 5, 6. While the current is flowing from the high-voltage positive terminal 13 toward the low-voltage positive terminal 11, the controller 15 turns on and turns off the upper switching elements and then turns on and turns off the lower switching elements in each of the sub-circuits 5, 6.

The power converters 110a, 110b, and 110c of the inverter 150 according to the second embodiment basically have the same structure and the same control rules as those of the voltage converter 10 according to the first embodiment. However, in the power converter 110a (110b, 110c), the stator coil 122a (122b, 122c) of the motor 80 also functions as the main reactor.

In the first embodiment, the low-voltage positive terminal 11 is an example of a first terminal, and the high-voltage positive terminal 13 is an example of a second terminal. The high-voltage negative terminal 14 is an example of a negative terminal. The battery 90 is an example of a first device and the inverter 50 is an example of a second device.

In the second embodiment, the AC terminal 111a (111b, 111c) is an example of the first terminal, and the DC positive terminal 113a (113b, 113c) is an example of the second terminal. The DC negative terminal 114a (114b, 114c) is an example of the negative terminal. The stator coils 122a (122b, 122c) can be regarded as the main reactor. In the second embodiment, the battery 90 is an example of the second device and the motor 80 is an example of the first device. In the second embodiment, a voltage converter may be connected between the battery 90 and the inverter 150.

In the power converter (voltage converter 10, power converters 110a to 110c) according to the embodiments, the two sub-circuits 5, 6 are connected in parallel. The technique disclosed in the present specification can be applied to a power converter in which three or more sub-circuits are connected in parallel.

The "electric vehicle" in the present specification includes hybrid vehicles having both a motor and an engine. In addition, the "electric vehicle" in the present specification may be a vehicle having both a battery and a fuel cell as power sources.

The technique disclosed in the present specification relates to an electrical circuit. Therefore, an expression "a device A and a device B are connected" means that the device A and the device B are electrically connected to each other. For example, the expression "a reactor connected between the device A and the device B" may represent a configuration in which elements other than the reactor (e.g., resistors and capacitors) are connected between the device A and the device B.

Although specific examples of the disclosure have been described in detail, these are merely exemplary and are not intended to limit the scope of the disclosure. The technologies described in claims include various modifications of the examples described above. The technical elements shown in the present specification or the drawings provide technical advantages individually or in combination, and the combinations of the technical elements are not limited to those in the claims. In addition, the technologies shown in the present specification or the drawings allow a plurality of objectives to be achieved simultaneously, and achieving only one of the objectives provides technical advantages.

What is claimed is:

1. A bidirectional power converter, comprising:
   a first terminal connected to an input and output end of a first device that allows input and output of electric power;
   a second terminal connected to an input and output end of a second device that allows input and output of electric power;
   a negative terminal connected to a negative electrode of the second device;
   a main reactor having a first end connected to the first terminal;
   a plurality of sub-circuits connected in parallel between a second end of the main reactor and the second terminal, each of the sub-circuits including
      an upper switching element connected to the second terminal, and a lower switching element connected between the upper switching element and the negative terminal,
      an upper diode in antiparallel connection with the upper switching element,
      a lower diode in antiparallel connection with the lower switching element, and
      a sub-reactor having one end connected to the second end of the main reactor and another end connected to a midpoint of a series connection between the upper switching element and the lower switching element, wherein the sub-reactor includes a conductor connecting the midpoint of the series connection and the main reactor, and a first magnetic ring core and a second magnetic ring core surrounding the conductor; and
      a second magnetic saturation current value at which the second magnetic ring core reaches a magnetic saturation is smaller than a first magnetic saturation current value at which the first magnetic ring core reaches a magnetic saturation; and
   a controller that sequentially controls the sub-circuits, the controller configured to:
      turn on and turn off the lower switching element and then turn on and turn off the upper switching element in each of the sub-circuits, while a current is flowing from the first terminal toward the second terminal; and
      turn on and turn off the upper switching element and then turn on and turn off the lower switching element in each of the sub-circuits, while the current is flowing from the second terminal toward the first terminal.

2. An electric vehicle, comprising:
   the bidirectional power converter according to claim 1;
   a battery serving as the first device; and
   an inverter serving as the second device, the inverter having an alternating-current end connected to a traveling motor, wherein
   the first terminal is connected to a positive terminal of the battery, the second terminal is connected to a direct-current positive terminal of the inverter, and the negative terminal is connected to a negative terminal of the battery and a direct-current negative terminal of the inverter.

3. An electric vehicle, comprising:
   an inverter including a bidirectional power converter, the converter including a first terminal, a second terminal, a negative terminal, a main reactor, a plurality of sub-circuits, and a controller that sequentially controls the sub-circuits,
      the first terminal being connected to an input and output end of a first device that allows input and output of electric power,
      the second terminal being connected to an input and output end of a second device that allows input and output of electric power,
      the negative terminal being connected to a negative electrode of the second device,
      the main reactor having a first end connected to the first terminal,
      the plurality of sub-circuits being connected in parallel between a second end of the main reactor and the second terminal, each of the sub-circuits including an upper switching element an upper switching element connected to the second terminal, and a lower switching element connected between the upper switching element and the negative terminal, an upper diode in antiparallel connection with the upper switching element, a lower diode in antiparallel connection with the lower switching element, and a sub-reactor having one end connected to the second end of the main reactor and another end connected to a midpoint of a series connection between the upper switching element and the lower switching element,
      the controller being configured to turn on and turn off the lower switching element of each of the sub-circuits, and then, turn on and turn off the upper switching element of each of the sub-circuits, while a current is flowing from the first terminal toward the second terminal, and
      the controller being configured to turn on and turn off the upper switching element of each of the sub-circuits, and then, turn on and turn off the lower switching element of each of the sub-circuits, while the current is flowing from the second terminal toward the first terminal;

a battery serving as the second device; and
a traveling motor serving as the first device and including a coil, wherein:
the second terminal is connected to a positive terminal of the battery, and the negative terminal is connected to a negative terminal of the battery;
the coil functions as the main reactor;
the upper switching element of the sub-circuit serves as an upper arm switching element of the inverter and is connected to the second terminal, and the lower switching element of the sub-circuit serves as a lower arm switching element of the inverter and is connected between the second terminal and the negative terminal;
the sub-reactor is connected between the midpoint of the series connection between the upper switching element and the lower switching element and the coil;
the sub-reactor includes a conductor connecting the midpoint of the series connection and the main reactor, and a first magnetic ring core and a second magnetic ring core surrounding the conductor; and
a second magnetic saturation current value at which the second magnetic ring core reaches a magnetic saturation is smaller than a first magnetic saturation current value at which the first magnetic ring core reaches a magnetic saturation.

4. A method for controlling a bidirectional power converter,
the bidirectional power converter including
a first terminal connected to an input and output end of a first device that allows input and output of electric power,
a second terminal connected to an input and output end of a second device that allows input and output of electric power,
a negative terminal connected to a negative electrode of the second device,
a main reactor having a first end connected to the first terminal,
a plurality of sub-circuits connected in parallel between a second end of the main reactor and the second terminal, each of the sub-circuits including
an upper switching element connected to the second terminal, and a lower switching element connected between the upper switching element and the negative terminal,
an upper diode in antiparallel connection with the upper switching element,
a lower diode in antiparallel connection with the lower switching element, and
a sub-reactor having one end connected to the second end of the main reactor and another end connected to a midpoint of a series connection between the upper switching element and the lower switching element,
wherein the sub-reactor includes a conductor connecting the midpoint of the series connection and the main reactor, and a first magnetic ring core and a second magnetic ring core surrounding the conductor; and
wherein a second magnetic saturation current value at which the second magnetic ring core reaches a magnetic saturation is smaller than a first magnetic saturation current value at which the first magnetic ring core reaches a magnetic saturation
the method comprising:
sequentially controlling, by a controller, the sub-circuits such that the lower switching element is turned on and turned off and then the upper switching element is turned on and turned off in each of the sub-circuits, while a current is flowing from the first terminal toward the second terminal; and
sequentially controlling, by the controller, the sub-circuits such that the upper switching element is turned on and turned off and then the lower switching element is turned on and turned off in each of the sub-circuits, while the current is flowing from the second terminal toward the first terminal.

* * * * *